United States Patent
Yamamoto et al.

(10) Patent No.: US 7,379,098 B2
(45) Date of Patent: May 27, 2008

(54) INTERPOLATION PROCESS FOR AN IMAGE PROCESSING APPARATUS

(75) Inventors: Toshihisa Yamamoto, Kanagawa (JP); Ken Nakajima, Tokyo (JP)

(73) Assignee: Sony Corporation, Tokyo (JP)

( * ) Notice: Subject to any disclaimer, the term of this patent is extended or adjusted under 35 U.S.C. 154(b) by 881 days.

(21) Appl. No.: 10/611,750

(22) Filed: Jul. 1, 2003

(65) Prior Publication Data

US 2004/0095475 A1 May 20, 2004

Related U.S. Application Data

(62) Division of application No. 09/195,380, filed on Nov. 18, 1998, now Pat. No. 6,611,287.

(30) Foreign Application Priority Data

Nov. 28, 1997 (JP) ............................. 09-329317

(51) Int. Cl.
  *H04N 5/228* (2006.01)
  *H04N 9/64* (2006.01)
(52) U.S. Cl. ............................. 348/222.1; 348/253
(58) Field of Classification Search ............. 348/222.1, 348/253
  See application file for complete search history.

(56) References Cited

U.S. PATENT DOCUMENTS

| 5,555,023 A | * | 9/1996 | Maenaka et al. | 348/253 |
| 5,734,424 A | * | 3/1998 | Sasaki | 348/222.1 |
| 5,742,710 A | | 4/1998 | Hsu et al. | 382/236 |
| 6,018,363 A | * | 1/2000 | Horii | 348/219.1 |
| 2003/0133034 A1 | * | 7/2003 | Takahashi | 348/345 |

* cited by examiner

*Primary Examiner*—James M. Hannett
(74) *Attorney, Agent, or Firm*—Frommer Lawrence & Haug LLP; William S. Frommer; Thomas F. Presson

(57) ABSTRACT

Camera signal processing for interpolating, at least on two directions, pixel data based on an imaging signal from a solid-state image sensor in which an imaging light enters through a color filter having a different spectral characteristic for each pixel separately generating interpolated pixel data in the directions, detecting a correlation value indicative of a degree of correlation in each of the directions of the interpolated pixel data, normalizing the correlation value of each of the directions to generate a normalized value indicative of a relative value of the correlation value of each of the directions, adding a predetermined correction value to the normalized value, weighting the interpolated pixel data by the normalized value and adding together the weighted interpolated pixel data, and generating an image based on the interpolated pixel data weighted by the weighting means.

6 Claims, 23 Drawing Sheets

CONSTITUTION OF SIGNAL PROCESSING CIRCUIT

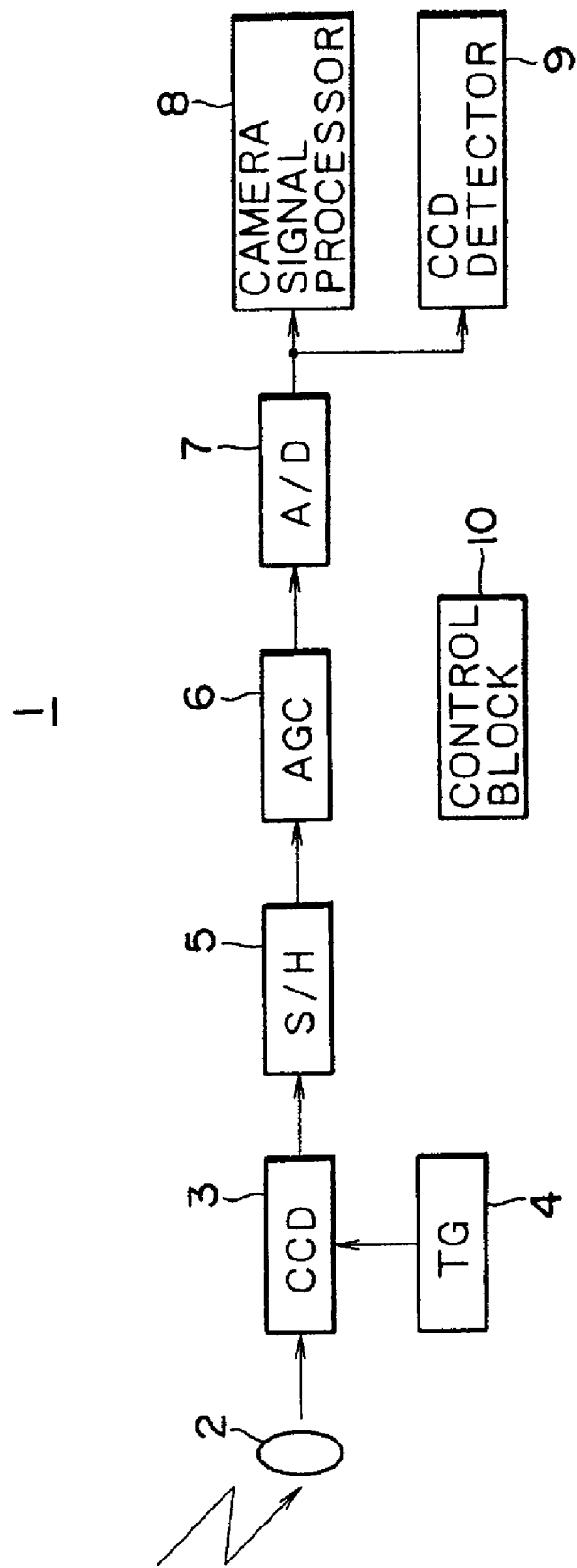

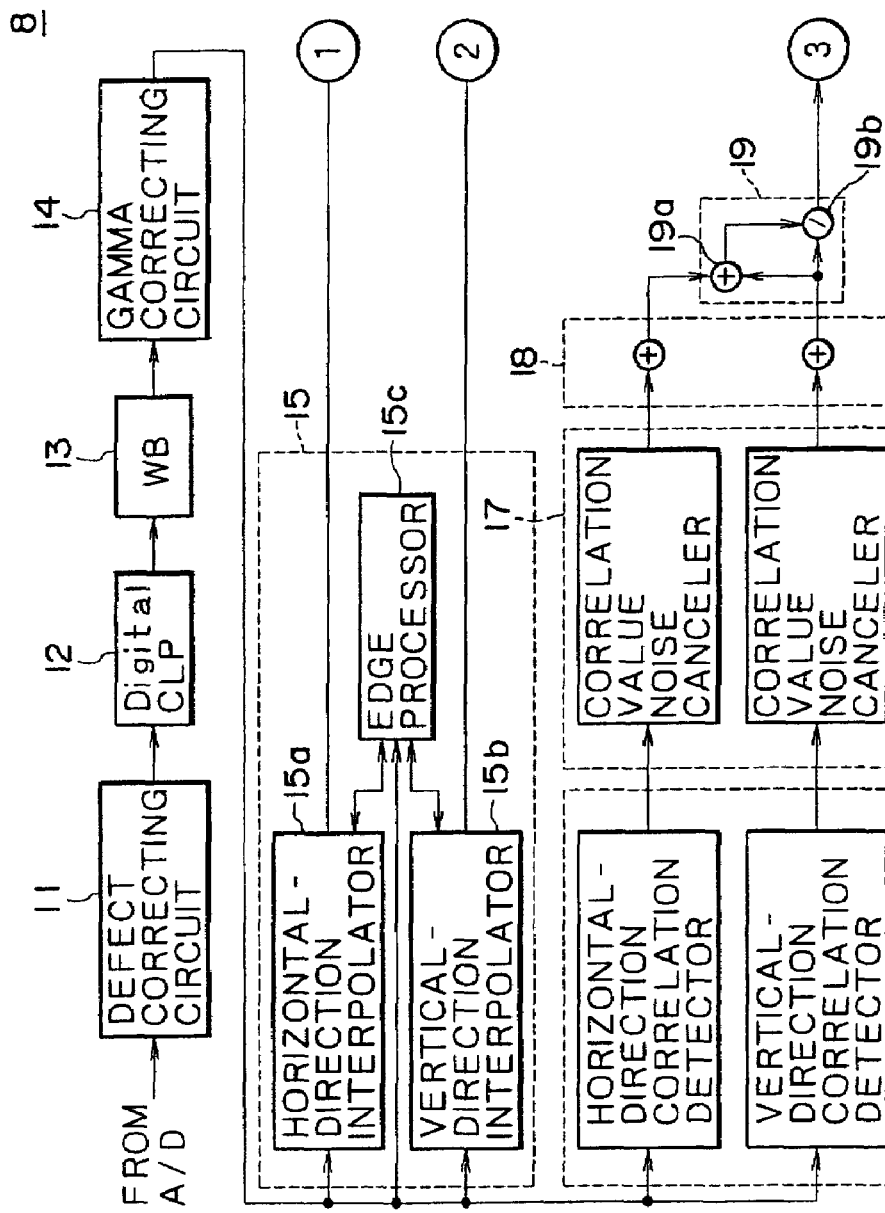

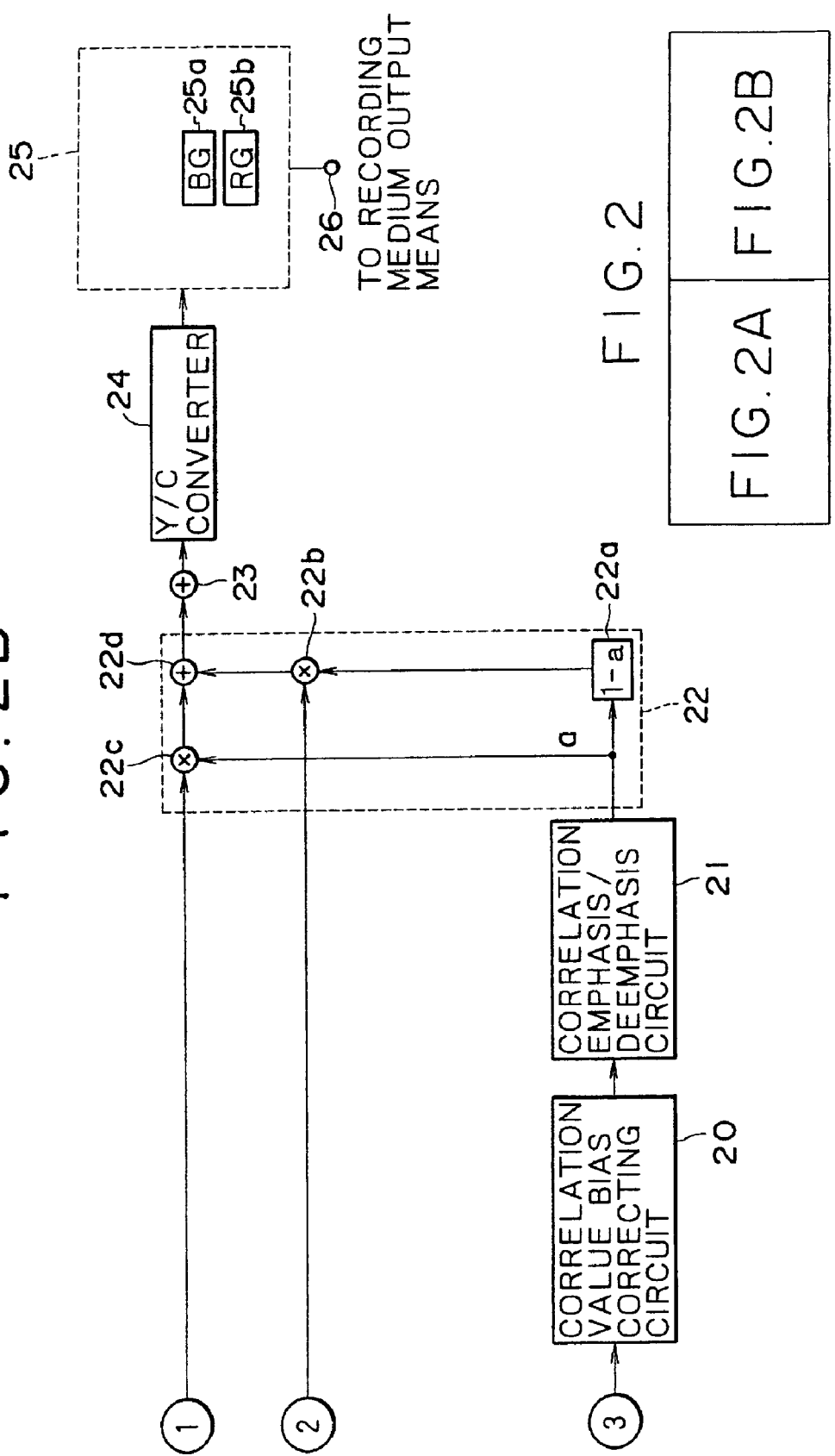

FIG. 3

| | | | | | |
|---|---|---|---|---|---|
| 0h | G 00 | R 01 | G 02 | R 03 | G 04 |
| 1h | B 10 | G 11 | B 12 | G 13 | B 14 |
| 2h | G 20 | R 21 | G 22 | R 23 | G 24 |
| 3h | B 30 | G 31 | B 32 | G 33 | B 34 |
| 4h | G 40 | R 41 | G 42 | R 43 | G 44 |

ARRANGEMENT OF PIXEL DATA

CONSTITUTION OF HORIZONTAL-DIRECTION INTERPOLATOR

FIG.5

| G 00 |      | G 02 |      | G 04 |
|      | G 11 |      | G 13 |      |
| G 20 |      | G 22 |      | G 24 |
|      | G 31 |      | G 33 |      |
| G 40 |      | G 42 |      | G 44 |

ARRANGEMENT OF PIXEL DATA

FREQUENCY CHARACTERISTIC OF LPF

FREQUENCY CHARACTERISTIC OF LPF

FIG. 8

| G 00' | G 01' | G 02' | G 03' | G 04' |
|-------|-------|-------|-------|-------|
| G 10' | G 11' | G 12' | G 13' | G 14' |
| G 20' | G 21' | G 22' | G 23' | G 24' |
| G 30' | G 31' | G 32' | G 33' | G 34' |
| G 40' | G 41' | G 42' | G 43' | G 44' |

INTERPOLATED PIXEL DATA

CONSTITUION OF HORIZONTAL-DIRECTION INTERPOLATOR

FIG. 10

|     |      |      |      |
|-----|------|------|------|
| 0h  |      |      |      |
| 1h  | B 10 | B 12 | B 14 |
| 2h  |      |      |      |
| 3h  | B 30 | B 32 | B 34 |
| 4h  |      |      |      |

ARRANGEMENT OF PIXEL DATA

FIG. 11

|       |       |       |
|-------|-------|-------|
| B 10  | B 12  | B 14  |
| B' 20 | B' 22 | B' 24 |
| B 30  | B 32  | B 34  |

ARRANGEMENT OF PIXEL DATA

FIG. 12

| B 0 0' | B 0 1' | B 0 2' | B 0 3' | B 0 4' |
|---|---|---|---|---|
| B 1 0' | B 1 1' | B 1 2' | B 1 3' | B 1 4' |
| B 2 0' | B 2 1' | B 2 2' | B 2 3' | B 2 4' |
| B 3 0' | B 3 1' | B 3 2' | B 3 3' | B 3 4' |

INTERPOLATED PIXEL DATA

CONSTITUTION OF EDGE PROCESSOR

EXAMPLE OF EDGE PROCESSING

CONSTITUTION OF HORIZONTAL-DIRECTION CORRELATION DETECTOR

CONSTITUTION OF NOISE CANCELER

PROCESSING OF CORRELATION VALUE 18a, 18b

CONSTITUTION OF OFFSET CIRCUIT

INPUT/OUTPUT CHARACTERISTIC

BLACK  BLACK  BLACK
  WHITE  WHITE

EXAMPLE OF IMAGE DATA

CONSTITUTION OF BIAS CORRECTING CIRCUIT

INPUT/OUTPUT CHARACTERISTIC

CONSTITUTION OF EMPHASIS/DEEMPHASIS CIRCUIT

INPUT/OUTPUT CHARACTERISTIC

FIG. 28A  FIG. 28B
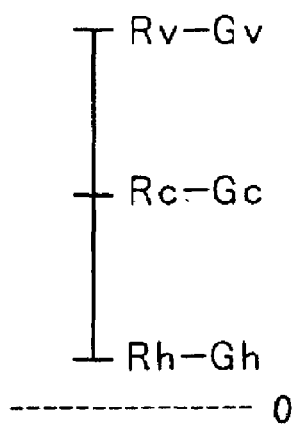
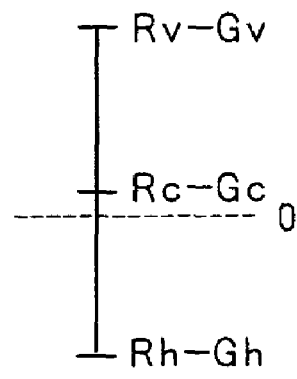
EXAMPLE OF SELECTING MINIMUM
INTERPOLATED PIXEL DATA
FIG. 29A  FIG. 29B
| G | R |
|---|---|
| B | G |
| G  | Ye |
|----|----|
| Cy | G  |
ARRANGEMENT OF PIXEL DATA

INTERPOLATION PROCESS FOR AN IMAGE PROCESSING APPARATUS

This is a divisional of application Ser. No. 09/195,380, filed Nov. 18, 1998 now U.S. Pat. No. 6,611,287.

BACKGROUND OF THE INVENTION

The present invention relates to a camera signal processing apparatus and a camera signal processing method for processing a camera signal generated by a camera apparatus of single-plate type. More particularly, the present invention relates to a camera signal processing apparatus and a camera signal processing method for computing a correlation value indicative of a correlation between interpolated values of pixels when a luminance signal or a color difference signal is generated from an imaging signal generated by a solid-state image sensor.

In a camera apparatus of single-plate type using a solid-state image sensor such as a charge coupled device (CCD) image sensor (hereafter simply referred to as a CCD), a color filter for transmitting lights corresponding to R (Red), G (Green), and B (Blue) is arranged on the CCD. In this color filter, a region for transmitting a red light, a region for transmitting a green light, and a region for transmitting a blue light are formed in matrix. For example, these regions are arranged as G, R, G . . . or B, G, B . . . horizontally. The light that passed each region of the color filter is inputted in the CCD. Then, pixel data G, pixel data R, and pixel data B are generated from the pixels corresponding to the R, G, and B regions of the color filter.

In this camera apparatus, a luminance signal and a color signal are generated based on the lights inputted in the CCD.

The CCD used in the above-mentioned camera apparatus is arranged with a color filter having R, G, and B for each pixel. The R, G, and B regions are arranged as R, G, R, G, . . . horizontally for example. In this camera apparatus, a color signal is generated in correspondence with the color filter arranged for each pixel. Therefore, in this CCD, in a pixel for which the color filter for transmitting a red light is arranged, the pixel data G and the pixel data B corresponding to G and B respectively are not generated, making it necessary for the data corresponding to G and, B to be generated by interpolation.

In the above-mentioned camera apparatus a method of processing a luminance camera signal generated by the CCD for example is known in which, for reading all pixels, pixel data is generated by performing arithmetic mean on the pixel data corresponding to four pixels, namely two vertical pixels and two horizontal pixels of the CCD.

In the single-plate camera apparatus, when generating pixel data by interpolation, correlation values indicative of correlations in vertical and horizontal directions are detected. In this detection, the signals of pixels arranged around are calculated by use of a filter to obtain the correlation value in vertical direction and the correlation value in horizontal direction. Further, in this camera apparatus, the pixel data obtained by interpolation is weighted by use of the obtained correlation values.

SUMMARY OF THE INVENTION

However, in the above-mentioned camera apparatus, the detection of a correlation value by the above-mentioned technique may fail to correctly detect the relationship between vertical correlation and horizontal correlation in the pixel data generated by the CCD.

Namely, the relationship between vertical correlation and horizontal correlation may not be correctly computed due to the aspect ratio of the CCD or a distortion or noise caused when an analog signal outputted from the CCD is detected or a high-frequency signal difficult to be detected for example.

If the relationship between vertical correlation and horizontal correlation is not correctly computed, it is difficult to determine in which of the vertical and horizontal directions the correlation is higher.

It is therefore an object of the present invention to provide a camera signal processing apparatus and a camera signal processing method capable of varying the relationship between vertical correlation and horizontal correlation by considering a signal distortion caused by the CCD for example.

In carrying out the invention and according to one aspect thereof, there is provided a camera signal processing apparatus comprising: a correlation detector for detecting a horizontal correlation value and a vertical correlation value for indicating degrees of correlation in horizontal and vertical directions of interpolated pixel data generated based on a position of pixel data detected by a solid-state image sensor and pixel data around that position and detecting a horizontal correlation value and a vertical correlation value for weighting the interpolated pixel data; a normalizing circuit for normalizing the horizontal correlation value and the vertical correlation value detected by the correlation detector to generate a normalized value indicative of a relative value between these correlation values; and a correcting circuit for adding a predetermined correction value to the normalized value generated by the normalizing circuit.

In carrying out the invention and according to another aspect thereof, there is provided a camera signal processing method comprising the steps of: detecting a horizontal correlation value and a vertical correlation Value for indicating degrees of correlation in horizontal and vertical directions of interpolated pixel data generated based on a position of pixel data detected by a solid-state image sensor and pixel data around that position and detecting a horizontal correlation value and a vertical correlation value for weighting the interpolated pixel data; normalizing the horizontal correlation value and the vertical correlation value detected in the correlation detecting step to generate a normalized value indicative of a relative value between these correlation values; and adding a predetermined correction value to the normalized value generated in the normalizing step.

BRIEF DESCRIPTION OF THE DRAWINGS

These and other objects of the invention will be seen by reference to the description, taken in connection with the accompanying drawing, in which:

FIG. 1 is a block diagram illustrating an example of a constitution of a camera apparatus;

FIG. 2 is a block diagram illustrating an example of a constitution of a signal processing circuit;

FIG. 3 is a diagram illustrating an example of an arrangement of pixel data R, G, and B each corresponding to each of pixels;

FIG. 5 is a diagram illustrating an example of an arrangement of pixel data G corresponding to each pixel;

FIG. 8 is a diagram illustrating an example of interpolated pixel data G' to be generated after interpolation;

FIG. 10 is a diagram illustrating an example of an arrangement of pixel data B corresponding to each pixel;

FIG. 11 is a diagram illustrating an example of an arrangement interpolated pixel data B' obtained when vertically performing arithmetic mean on the pixel data B corresponding to each pixel;

FIG. 12 is a diagram illustrating an example of interpolated pixel data B' to be generated after interpolation;

FIG. 28A and FIG. 28B are diagrams illustrating examples of selecting minimum absolute value interpolated pixel data Rh and Gh of the color differences of interpolated pixel data Rv and Gv for pixel data R and G vertically arranged in a color difference signal suppressor, interpolated pixel data Rh and Gh for horizontally arranged pixel data R and C, and weighted interpolated pixel data Rc and Gc; and FIGS. 29A and 29B are diagrams illustrating other examples of pixel data arrangements.

DETAILED DESCRIPTION OF PREFERRED EMBODIMENTS

Figure 4:
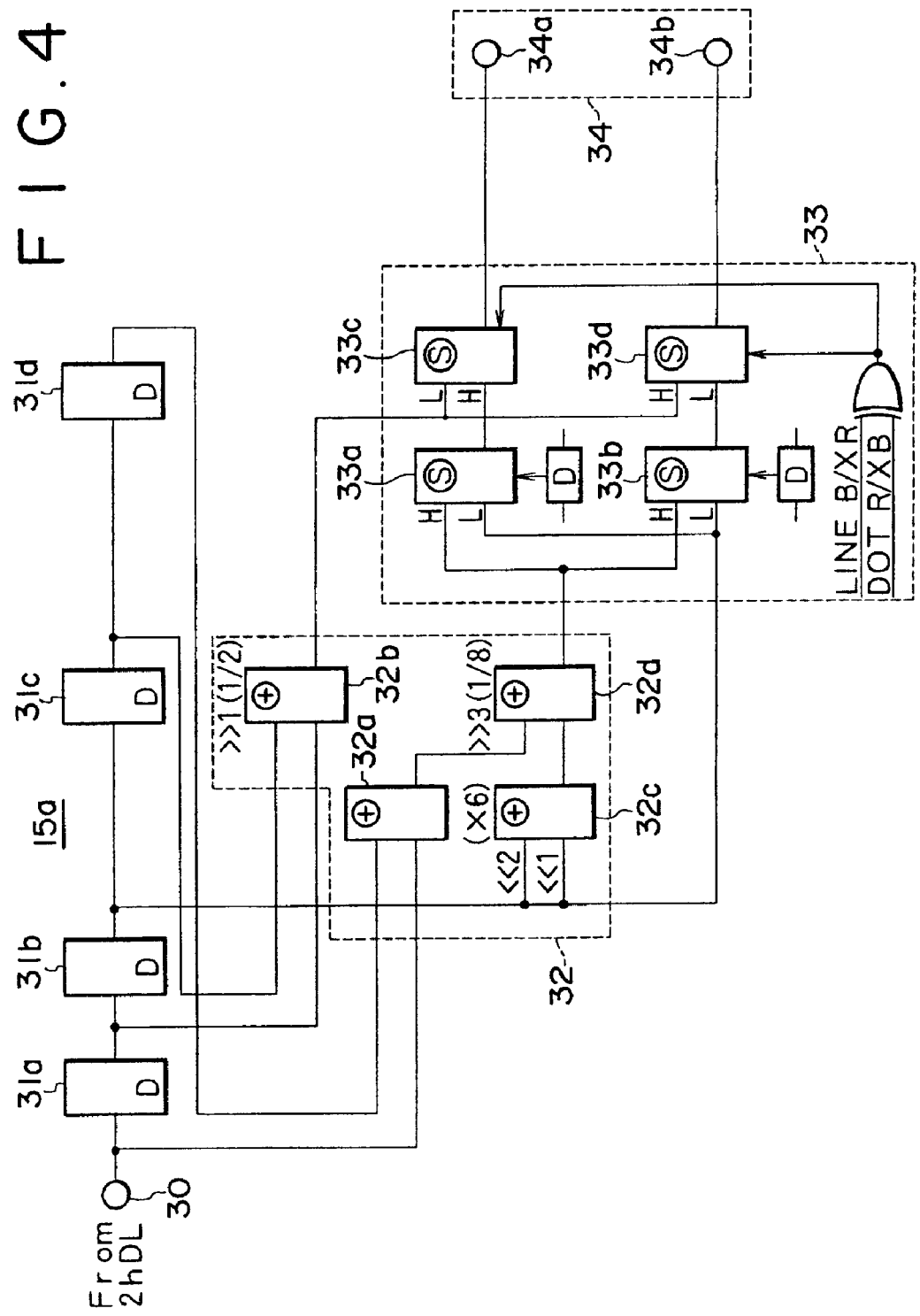
FIG. 4 is a circuit diagram illustrating an example of a constitution of a vertical-direction interpolator.

This invention will be described in further detail by way of example with reference to the accompanying drawings.

As shown in FIG. 1, a camera signal processing apparatus associated with the present invention is applicable to a camera apparatus 1 for generating a still image according to an inputted light for example.

The camera apparatus 1 comprises an optical system 2 for forming the image of a subject onto a CCD (Charge Coupled Device) imager (hereafter simply referred to as a CCD), a CCD 3, a timing generator 4 for driving the CCD 3, a sample-and-hold circuit 5 for into which an imaging signal is inputted, an AGC (Automatic Gain Control) circuit 6 into which the imaging signal is inputted from the sample-and-hold circuit 5 for gain control, an A/D converter 7 for converting the inputted imaging signal into digital image data, a camera signal processor 8 for performing camera signal processing on the image data, a CCD detector 9 for detecting the imaging signal generated by the CCD 3, and a control block 10 for controlling the-above-mentioned components.

The CCD 3 has a color filter in which a region for transmitting a red light (R), a region for transmitting a green light (G), and a region for transmitting a blue light (B) are formed in a matrix. The lights transmitted through the color filter for each pixel are inputted in the CCD 3. In this color filter, these color transmitting regions are arranged as R, G, R, G, . . . or G, B, G, B, . . . in a horizontal direction for example. Namely, the CCD 3 generates pixel data R, pixel data G, and pixel data B based on the lights corresponding to R, G, and B for each pixel.

The image data outputted from the A/D converter 7 is inputted in the CCD detector 9. The image data detected by the CCD detector 9 is inputted in an AE (Automatic Exposure) circuit and an AF (Automatic Focus) circuit, not shown, for example. The image data inputted in the AE circuit for example is used for adjusting the speed or aperture of an electronic shutter, thereby automatically switching between the brightness levels of light entering the CCD 3.

Referring to FIG. 2, the camera signal processor. 8 comprises a defect correcting circuit 11 into which the image data is inputted from the A/D converter 7, a CLP (Clamp) circuit 12 into which the image data is inputted from the defect correcting circuit 11, a white balance circuit 13 into which the image data is inputted from the CLP circuit 12, and a γ (gamma) correcting circuit 14 into which the image data is inputted from the white balance circuit 13.

The defect correcting circuit 11 performs defect correction on the image data supplied from the A/D converter 7. The defect correcting circuit 11 corrects a defect of a pixel for which no pixel data is generated because the CCD 3 has a defect and outputs the corrected image data to the CLP 12.

In the CLP circuit 12, optical black is subtracted from the image data supplied from the defect correcting circuit 11. Thus, the CLP circuit 12 corrects the black level of the inputted image data and outputs the resultant image data to the white balance circuit 13.

The white balance circuit 13 adjusts the levels of the colors corresponding to the image data R, G, and B supplied from the CLP circuit 12. Thus, the white balance circuit 13 outputs the image data corrected in level for each color to the gamma correcting circuit 14.

The gamma correcting circuits 14 performs gamma correction on the image data supplied from the white balance circuit 13. Then, the gamma correcting circuit 14 outputs the corrected image data to an image data interpolating block and a correlation value detecting block to be described later.

Referring to FIG. 2 again, the camera signal processor 8 comprises the image data interpolating block 15 into which the image data is inputted from the gamma correcting circuit 14, a correlation value detecting block 16 for detecting a correlation value between the pieces of image data, a noise canceling block 17 for eliminating a noise from the correlation value, an offset circuit 18 for offsetting the correlation value, a normalizing circuit 19 for normalizing the correlation value, a bias correcting circuit 20 for correcting the bias in the direction of correlation detection, an emphasis/deemphasis circuit 21 for emphasizing or deemphasizing the correlation, a weighted addition circuit 22 for weighting the interpolated image data by use of the correlation value, a contour correcting circuit 23 for correcting the contour of the image data, a Y/C converter 24 for converting the image data into a Y/C signal composed of a luminance signal (Y) and a color difference signal (C), a color difference signal suppresser 25 for suppressing a false color signal caused by a color difference signal, and an output block 26.

Image data composed of plural pieces of pixel data is inputted from the gamma correcting circuit 14 into the image data interpolating block 15. The image data interpolating block 15 perform interpolation on the pixel data R, G, and B for each pixel to generate interpolated pixel data R', G', and B'. The image data interpolating block 15 includes a horizontal-direction interpolator 15a for interpolating the pixel data corresponding to horizontally arranged pixels and a vertical-direction interpolator 15b for interpolating the pixel data corresponding to vertically arranged pixels.

The pixel data R, G, and B corresponding to the pixels arranged in a matrix as shown in FIG. 3 is inputted in the horizontal-direction interpolator 15a. The horizontal-direction interpolator 15a computes the interpolated pixel data in horizontal direction by use of a filter expressed in a relation (1) below. It should be noted that FIG. 3 shows the pixel data R, G, and B each corresponding to each pixel and indicates each pixel in a coordinate number. In what follows, it is assumed that the pixels be arranged on horizontal lines 0h, 1h, 2h, 3h, and 4h.

$$[1, 4, 6, 4, 1]/8 \quad (1)$$

Because the filter indicated by the relation (1) is used to compute interpolated pixel data R', G', and B', the horizontal-direction interpolator 15a is constituted as shown in FIG. 4.

When generating the interpolated pixel data R', G', and B' in horizontal direction, the horizontal-direction interpolator 15a is constituted as shown in FIG. 4. The horizontal-direction interpolator 15a comprises an input block 30 into which pixel data is inputted from the gamma correcting circuit 14, a delay circuit 31 into which each piece of pixel data is inputted from the input block 30, a filter 32 into which each piece of pixel data in horizontal direction is inputted from the delay circuit 31 to generate interpolated pixel data, a selector 33 into which the interpolated pixel data is inputted through the filter 32, and an output terminal 34 from which the interpolated pixel data supplied from the selector 33 is outputted.

Pixel data pieces in horizontal direction are sequentially inputted in the input block 30 from the gamma correcting circuit 14. These pixel data pieces are inputted in the input block 30 one at each clock.

The delay circuit 31 includes delay circuits 31a through 31d into which the pixel data inputted in the input block 30 are inputted. In the delay circuit 31, the inputted pixel data are inputted in the delay circuits 31a through 31d in synchronization with the above-mentioned clock, the delayed pixel data being outputted to the filter 32.

The filter 32 includes an adder 32a into which the pixel data is inputted through the input block 30 and the delay circuit 31d, an adder 32b into which the pixel data is inputted through the delay circuit 31a and the delay circuit 31c, an adder 32c into which the pixel data is inputted through the delay circuit 31b, and an adder 32d into which the outputs from the adder 32a and the adder 32c are inputted.

In the adder 32a, the pixel data directly from the input block 30 and the pixel data through the delay circuit 31d are inputted. In the adder 32c, the pixel data is inputted through the delay circuit 31b. In the adder 32d, the pixel data is inputted through the adder 32a and the adder 32c. In the adder 32b, the pixel data is inputted through the delay circuit 31a and the delay circuit 31c.

Namely, the filter 32 constitutes filter [1, 0, 6', 0, 1]/8 by the adders 32a, 32c, and 32d and filter [1, 0, 1]/2 by the adder 32b.

The selector 33 includes a selector 33a and a selector 33b into which the output of the adder 32d and the pixel data through the delay circuit 31b are inputted, a selector 33c into which the output of the selector 33a and the output of the adder 32b are inputted, and a selector 33d into which the outputs of the adder 32b and the selector 33b are inputted.

A control signal is inputted from the control block 10 into these selectors 33a through 33d to control the operations of thereof.

The output block 34 has a terminal 34a for outputting the data from the selector 33c and a terminal 34b for outputting the data from the selector 33d to an edge processor circuit to be described later.

The horizontal-direction interpolator 15a thus constituted computes not only interpolated pixel data R22' and B22' but also interpolated pixel data G22' for pixel data G22 for example.

When the horizontal-direction interpolator 15a computes interpolated pixel data G22' for pixel data G22 shown in FIG. 3, pixel data G20, R21, G22, R23, and G2 in 2 h are sequentially inputted in the input block 30.

Next, the pixel data G20, R21, G22, R23, and G24 inputted in the input block 30 are inputted into the filter 32 through the delay circuit 31. Namely, the pixel data G20 is inputted into the adder 32a, the pixel data R21 is inputted into the adder 32b, the pixel data G22 is inputted into the adder 32c, the pixel data R23 is inputted into the adder 32b, and the pixel data G24 is inputted into the adder 32a.

Then, the filter 32 computes interpolated pixel data G22' for the pixel data G22 from the pixel data G20, G22, and G24. Namely, the adder 32a adds the pixel data G20 and the pixel data G24 and outputs a result to the adder 32d. The adder 32c adds a result of quadrupling the pixel data G22 and a result of doubling the pixel data G22 and outputs a result of this addition to the adder 32d. Then, the adder 32d adds the outputs of the adder 32a and the adder 32c and performs ⅛ multiplication on a result of this addition to output a result of the multiplication to the selector 33. The adder 32b adds the pixel data R21 and the pixel data R23 and performs ½ multiplication on a result of this addition to output a result of this multiplication to the selector 33.

Thus, by performing the adding operations by the adders 32a, 32c, 32d, {pixel data G20+6×pixel data G22+pixel data G24}/8 is computed. Namely, the filter 32 constitutes filter [1, 0, 1]/2 by the adder 32b, constitutes filter [1, 0, 6, 0, 1]/8 by the adders 32a, 32c, and 32d, and passes the pixel data G20, G22, and G24 through the filter indicated in the relation (1) above. Therefore, according to the filter 32, interpolated pixel data R22' and G22' for the pixel data R22 and G22 are generated.

Then, the interpolated pixel data G22' and the pixel data G22 are inputted in the selector 33a and the selector 33b. A control signal H or a control signal L from the control block 10 is also inputted in the selector 33a and the selector 33b. When the control signal H is inputted, the selector 33a and the selector 33b output the interpolated pixel data G22' supplied from the filter 32 to the selector 33c and the selector 33d. When the control signal L is inputted, the selector 33a and the selector 33b output the pixel data G22 to the selector 33c and the selector 33d without change.

Next, because the interpolated pixel data G22' for the pixel data G22 is generated by the filter 32, the control block 10 outputs the control signal L to the selector 33c and the selector 33d. When the control signal L is thus inputted into the selector 33c and the selector 33d, the selector 33c outputs the interpolated pixel data R22' and the selector 33d outputs the pixel data G22 or the interpolated pixel data G22'.

On the other hand, when the control signal H is inputted from the control block 10 into the selector 33c and the selector 33d, the selector 33c outputs the data supplied from the selector 33a and the selector 33d outputs the data supplied from the adder 32b.

The selector 33c outputs interpolated pixel data R' or interpolated pixel data B' to the terminal 34a. The selector 33d outputs interpolated pixel data G' to the terminal 34b. When outputting the interpolated pixel data G22' for the pixel data G22 for example, the selector 33d is controlled to output the input from the selector 33b. When outputting the interpolated pixel data G23' for the pixel data R23 for example, the selector 33d is controlled to output-the input from the adder 32b. When outputting the interpolated pixel data R22' for the pixel data G22 for example, the selector 33c is controlled to output the input from the adder 32b. When outputting the interpolated pixel data R23' for the pixel data R23, the selector 33c is controlled to output the input from the selector 33a.

Figure 6:
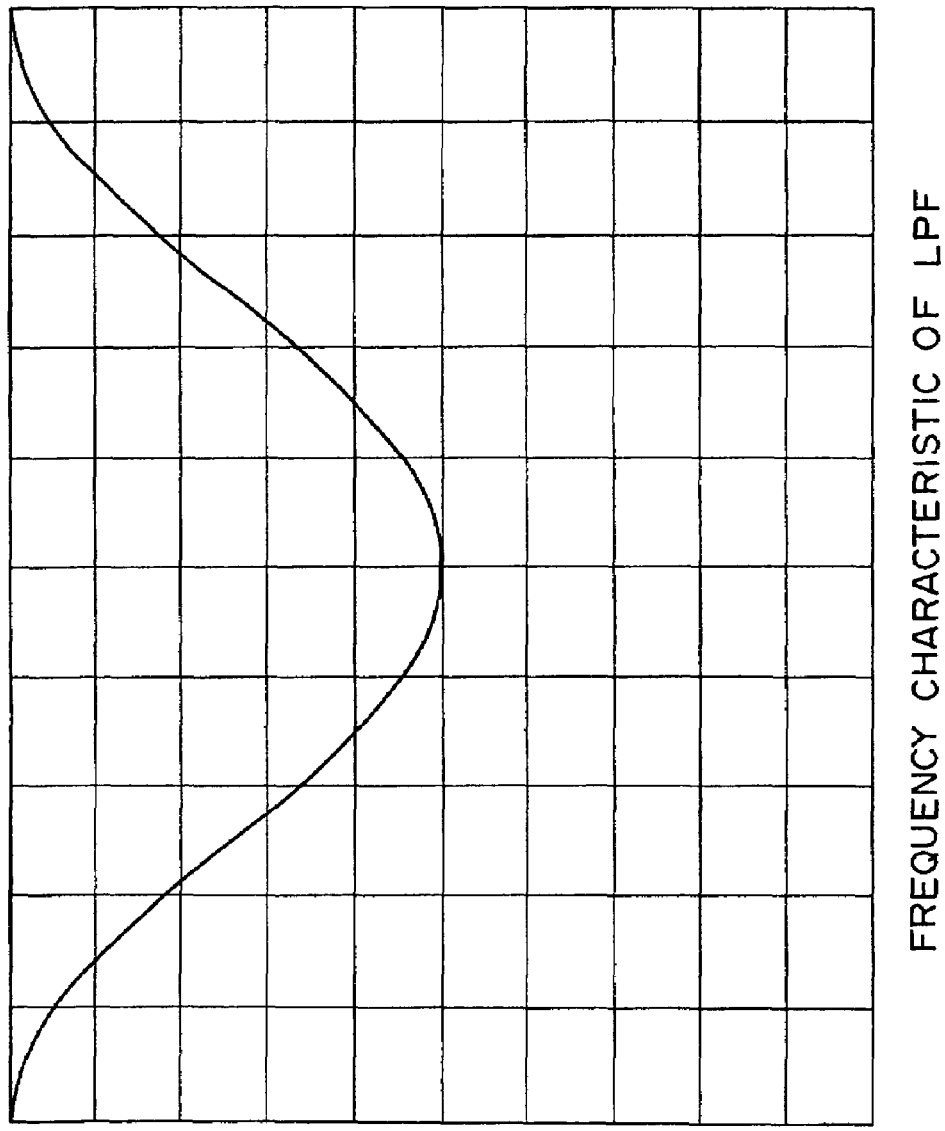
FIG. 6 is a graph illustrating a frequency characteristic of an LPF [1, 0, 6, 0, 1]
Figure 7:
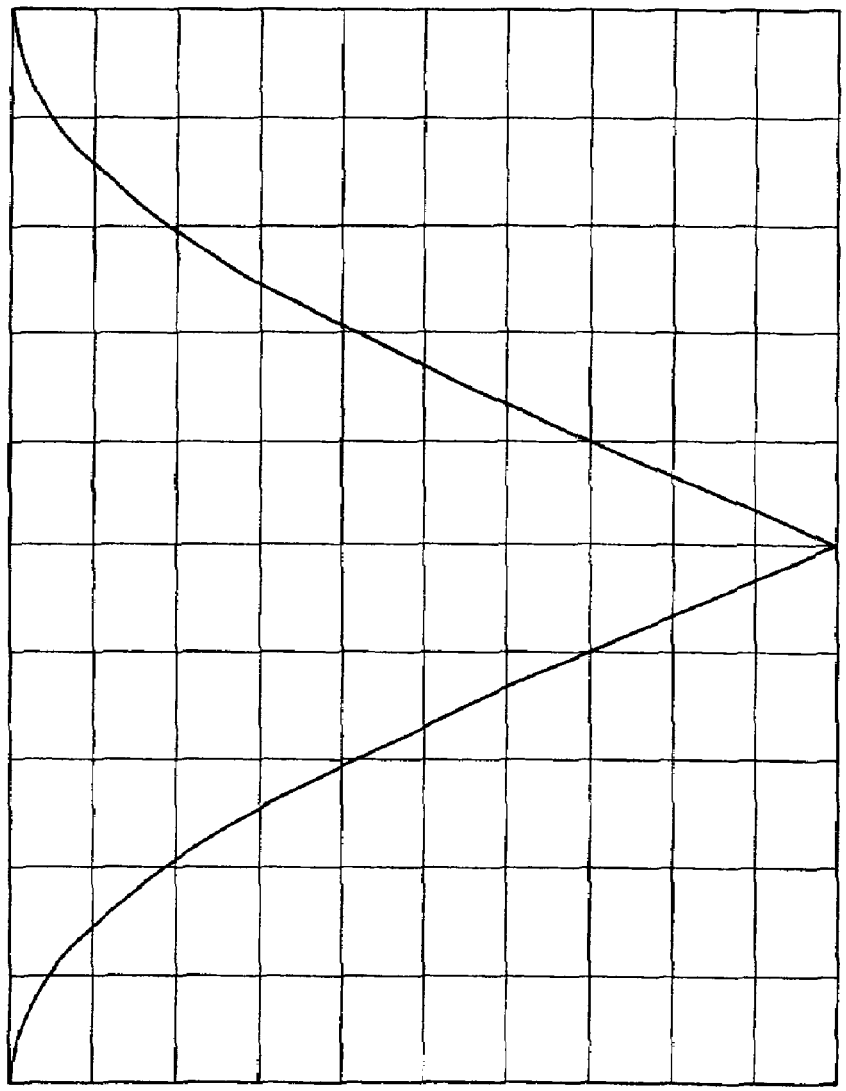
FIG. 7 is a graph illustrating a frequency characteristic of an. LPF [1, 0, 1]

In computing the interpolated pixel data G' for pixel data G, the interpolated pixel data G' is computed supposing the CCD 3 consisting of only the pixel data G as shown in FIG. 5, of the inputted pieces of pixel data R and G. Therefore, when computing the interpolated pixel data G' for a pixel for which no pixel data G exists, the horizontal-direction interpolator 15a uses filter [1, 0, 1]/2 to compute the interpolated pixel data G'. When computing the interpolated pixel data G' for the pixel for which pixel data G exists, the horizontal-direction interpolator 15a uses filter [1, 0, 6, 0, 1]/8 to compute the interpolated pixel data G'. Therefore, in the horizontal-direction interpolator 15a that computes the interpolated pixel data G' by use of these filters, the frequency characteristics of these filters are as shown in FIGS. 6 and 7. Namely, filter [1, 0, 6, 0, 1]/8 presents the frequency characteristic shown in FIG. 6, while filter [1, 0, 1]/2 presents the frequency characteristic shown in FIG. 7. According to these frequency characteristics, by use of these filters, the horizontal-direction interpolator 15a can reduce the difference between the frequency characteristic of the interpolated pixel data G' in the pixel for which the pixel data G exists and the frequency characteristic of the interpolated pixel data G' in the pixel for which the pixel data G does not exist.

Consequently, computing the interpolated pixel data G' for each piece of pixel data G can obtain the interpolated pixel data G' as shown in FIG. 8.

As described above, the horizontal-direction interpolator 15a computes the interpolated pixel data R22' for the pixel data G22 in 2h by use of filter [1, 0, 1]/2. In 1h, the horizontal-direction interpolator 15a can also compute the interpolated pixel data B11' for pixel data G11.

Figure 9:
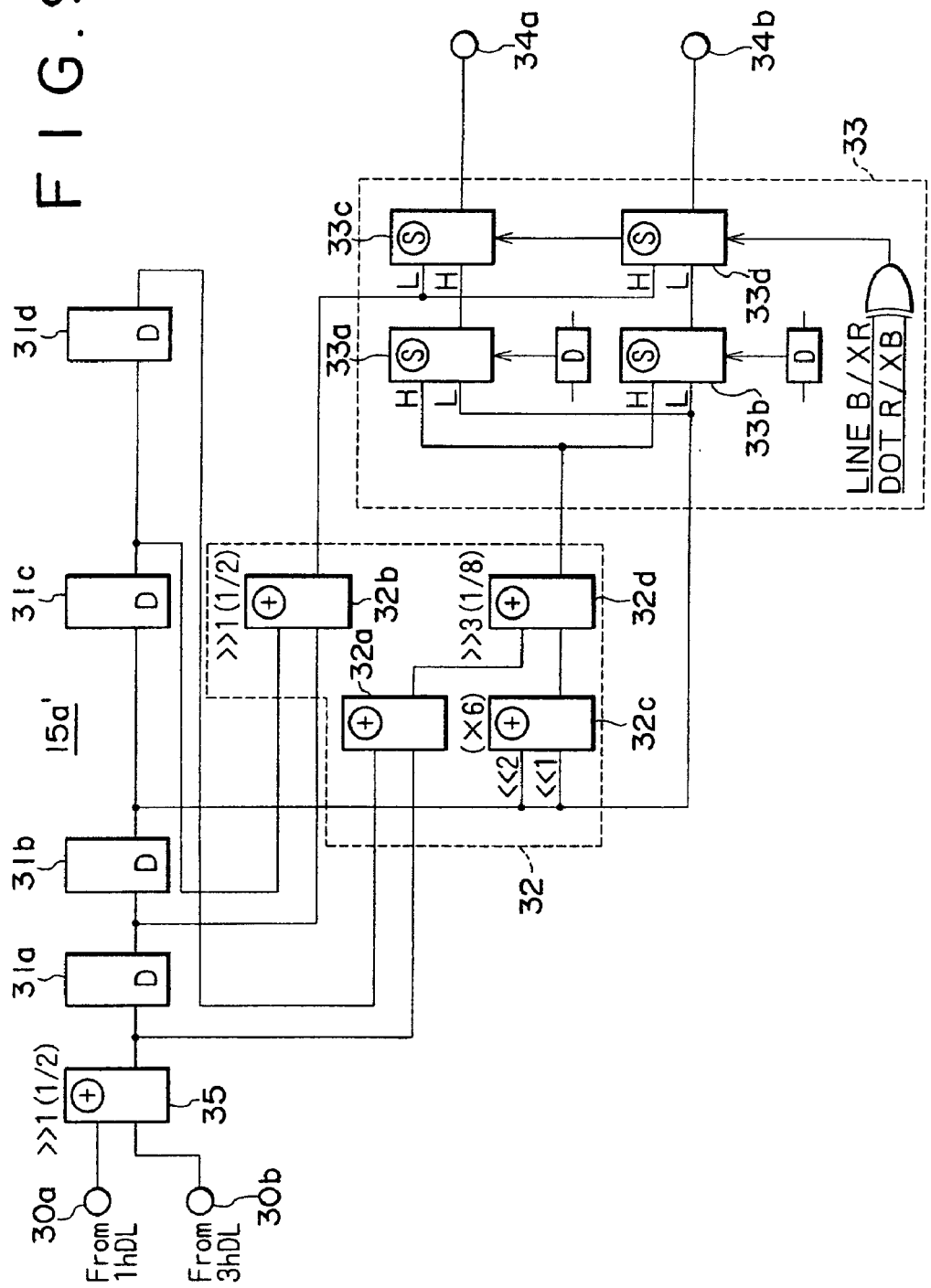
FIG. 9 is a circuit digram illustrating an example of a horizontal-direction interpolator.

When computing interpolated pixel data B22' for pixel data G22 in 2h, a filter shown in FIG. 9 is used. In what following, an example in which interpolated pixel data B' is computed in a line having no pixel data B.

When computing interpolated pixel data B22' for pixel data G22, a horizontal-direction interpolator 15a' constituted as shown in FIG. 9 is used. It should be noted that, with reference to the horizontal-direction interpolator 15a', components similar to those previously described with the horizontal-direction interpolator 15a shown in FIG. 4 are denoted by the same reference numerals and the description of the common components will be skipped. Namely, in the horizontal-direction interpolator 15a' shown in FIG. 9, the input block 30 is composed of a terminal 30a into which the pixel data in 1h are inputted in the order of B10, G11, B12, G13, and B14 for example and a terminal 30b into which the pixel data in 3h are inputted in the order of B30, G31, B32, G33, and B34 for example. The horizontal-direction interpolator 15a' also has an adder 35 into which the pixel data are inputted from the terminals 30a and 30b. The adder 35 performs an adding operation and a dividing operation on the inputted pixel data. Namely, the adder 35 performs an operation {pixel data B10+pixel data B30}/2 for example. Like the horizontal-direction interpolator 15a shown in FIG. 4, the horizontal-direction interpolator 15a' shown in FIG. 9 outputs interpolated pixel data G' and B' by way of delay circuits 31a through 31d, an adder 32, and a selector 33.

Namely, the horizontal-direction interpolator 15a' first performs arithmetic mean on the pixel data B corresponding to the pixels arranged in vertically adjacent 1h and 3h for vertical interpolation, thereby computing interpolated pixel data B' by vertically interpolating as shown in FIG. 11 the pixel data B of the pixels arranged as shown in FIG. 10.

Next, the horizontal-direction interpolator 15a' computes the horizontal-direction interpolated pixel data B' for the pixel data B by putting the vertical-direction pixel data B and its interpolated pixel data B' through filter [1, 0, 6, 0, 1]/8 and filter [1, 0, 1]/2.

Namely, the horizontal-direction interpolator 15a' generates the interpolated pixel data B22' for a line having no pixel data B horizontally as follows. First, in the filter 32, filter [1, 0, 6, 0, 1]/8 is applied to the pixel data B in 1h and 3h through the adders 32a, 32c, and 32d and filter [1, 0, 1]/2 is applied to the pixel data G in 1h and 3h through the adder 32b. The horizontal-direction interpolator 15a' also has a subtraction processing circuit for subtracting the value of the pixel data G obtained through filter [1, 0, 1]/2 from the value of the pixel data B obtained through filter [1, 0, 6, 0, 1]/8 and an addition processing circuit for adding the interpolated pixel data G22' obtained by the horizontal-direction interpolator 15a shown in FIG. 4 to the output of this subtraction processing circuit.

In other words, the horizontal-direction interpolator 15a' subtracts the value of the pixel data G obtained through filter [1, 0, 1]/2 from the value of the pixel data B obtained through filter [1, 0, 6, 0, 1]/8 and adds the pixel data G' to the resultant value of the subtraction, outputting the interpolated pixel data B' to a weighted addition circuit 22.

Thus, the horizontal-direction interpolator 15a' shown in FIG. 9 can compute the interpolated pixel data B22' as shown in FIG. 12 even for the pixel data G22 corresponding to the pixel for which no pixel data B exists as with 2h. Namely, according to the horizontal-direction interpolator 15a' shown in FIG. 9, the interpolated pixel data B' can be computed for all pixels.

Further, when computing the interpolated pixel data B22' for the pixel data G22, the horizontal-direction interpolator 15a' can use the interpolated pixel data obtained by the following relation (2) and the above-mentioned relation (1).

$$B22'=\{(B12'-G12')+(B32'-G32')\}/2+G22' \quad (2)$$

According to the relation (2), the interpolated pixel data B22' can be computed by use of G12', G32', and G22' computed by the horizontal-direction interpolator 15a and B32' and B12' computed by the relation (1).

Figure 13:
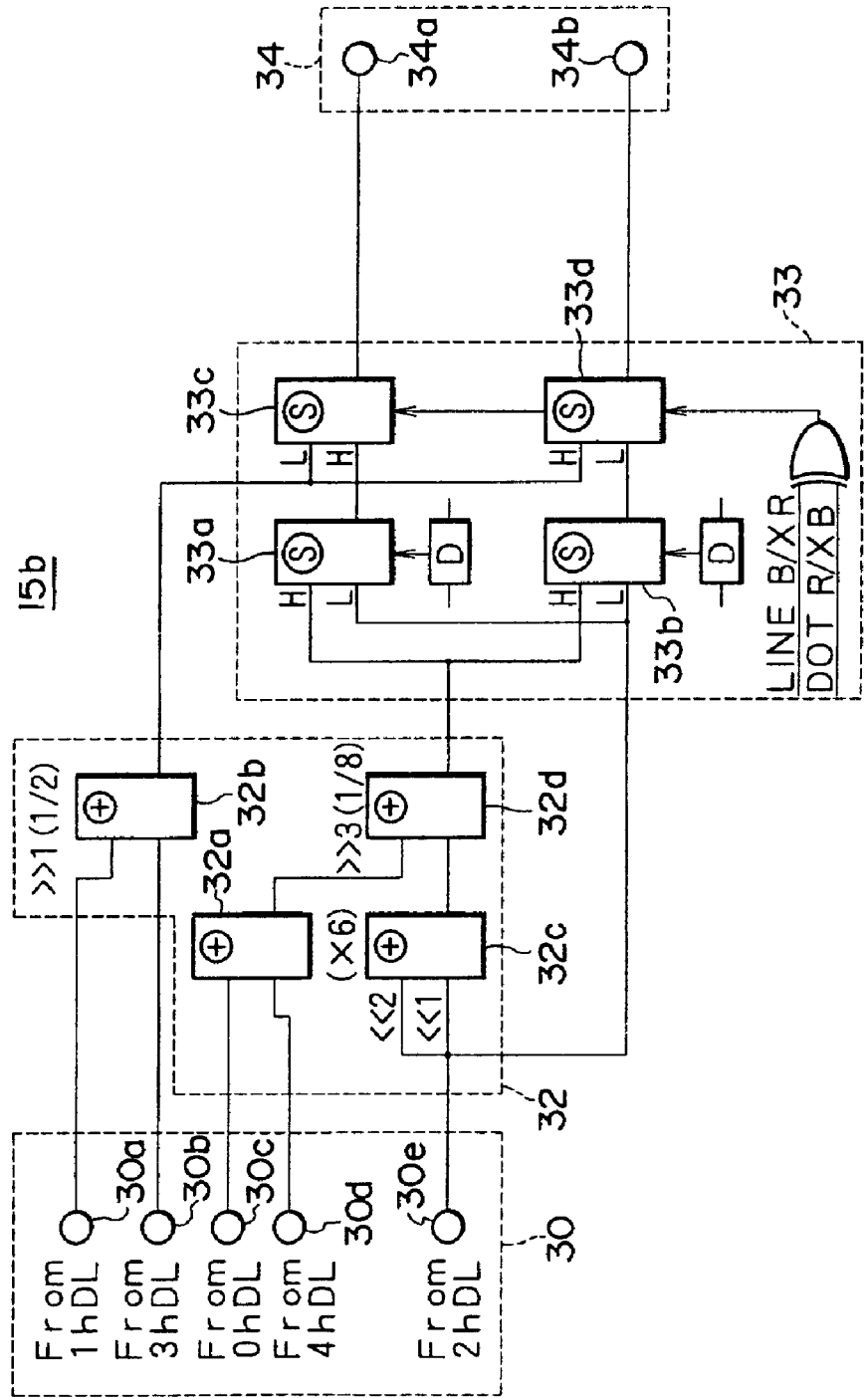
FIG. 13 is a circuit diagram illustrating an example of a constitution of a vertical-direction interpolator.

On the other hand, the vertical-direction interpolator 15b is constituted as shown in FIG. 13. It should be noted that with reference to the vertical-direction interpolator 15b to be described below, components similar to those previously described with the horizontal-direction interpolator 15a are denoted by the same reference numerals and the description of the common components will be skipped.

As shown in FIG. 13, the vertical-direction interpolator 15b has an input block 30 into which the pixel data R, pixel data G, and pixel data B in vertical direction are sequentially inputted. The input block 30 has a terminal 30a into which the pixel data in 1h is inputted, a terminal 30b into which the pixel data in 3h is inputted, a terminal 30c into which the pixel data in 0h is inputted, a terminal 30d into which the pixel data in 4h is inputted, and a terminal 30e into which the pixel data in 2h is inputted.

Like the above-mentioned horizontal-direction interpolator 15a, the vertical-direction interpolator 15b also has a filter 32, selector 33, and an output block 34.

When pixel data B10, B30, G00, G40, and G20 are inputted in the terminals 30a through 30e, the vertical-direction interpolator 15b outputs the pixel data inputted in the terminals 30a and 30b to the adder 32b, the pixel data inputted in the terminals 30c and 30d to the adder 32a, and the pixel data inputted in the terminal 30e to the adder 32c. Then, like the horizontal-direction interpolator 15a, the vertical-direction interpolator 15b applies these pieces of input pixel data to the above-mentioned relations (1) and (2) through the filter 32, thereby obtaining the interpolated pixel data R', G', and B' for the pixel data R, G, and B.

Figure 14:
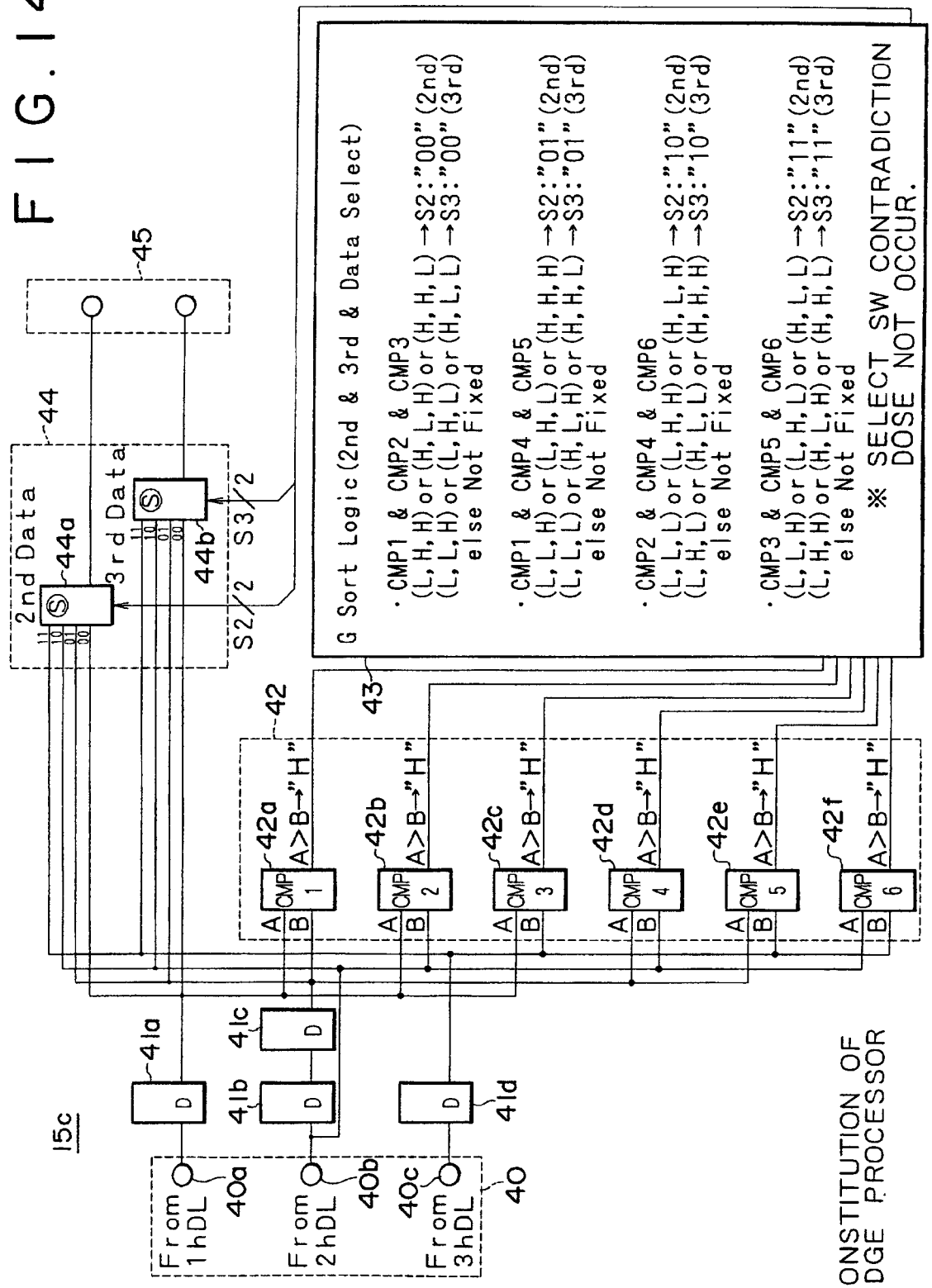
FIG. 14 is a circuit diagram illustrating an example of a constitution of an edge processor.

The horizontal-direction interpolator 15a and the vertical-direction interpolator 15b that constitute the image data interpolating block 15 are connected to an edge processor 15c. Referring to FIG. 14, the edge processor 15c comprises an input block 40 composed of terminals 40a through 40c in which the delayed pixel data G from the above-mentioned gamma correcting circuit 14 is inputted, delay circuits 41a through 41d into which the pixel data G is inputted from the terminals 40a through 40c, a comparing block 42 for making comparison between the pieces of inputted pixel data G, a computing block 43 for performing computation processing on a result obtained in the comparing block 42, an output block 44 for controlling the output according to a result obtained in the computing block 43, and an output terminal 45 for outputting the resultant pixel data from the output block 44. The pixel data G is also inputted from the gamma correcting circuit 14 into the edge processor 15c. The following describes the edge processor 15c by use of an example in which the values of interpolated pixel data G' shown in FIG. 15 are controlled.

Figure 15:
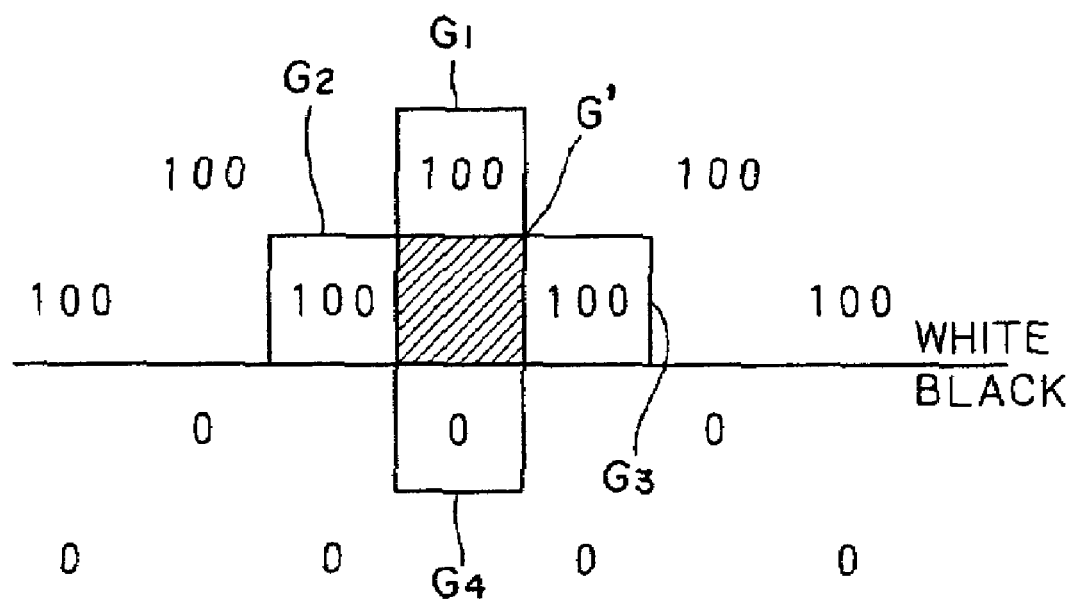
FIG. 15 is a diagram illustrating an example of edge processing to be performed by the edge processor.

The input block 40 receives pixel data G1 through G4 around the interpolated pixel data G' of FIG. 15 obtained by interpolation by the horizontal-direction interpolator 15a and the vertical-direction interpolator 15b. When performing edge processing on the interpolated pixel data in 2h for example, the input block 40 has the terminal 40a into which the pixel data G1 in 1h adjacent above the interpolated pixel data G' is inputted, the terminal 40b into which the pixel data G2 and G3 horizontally adjacent to the interpolated pixel data G' are inputted, and the terminal 40c into which the pixel data G4 in 3h adjacent below the interpolated pixel data G' is inputted. The terminals 40a through 40c are connected to the delay circuits 41a through 41d as shown in FIG. 14. The pixel data G1, G2, G3, and G4 are delayed to be inputted in the terminals 40a through 40c.

The delay circuits 41a through 41d are connected to the comparing block 42 and the output block 44. The pixel data G1 through G4 are inputted from the input block 40 into the delays circuits 41a through 41d. The delay circuits 41a through 41d output the pixel data G1 through G4 to the comparing block 42 and the output block 44 on a clock that is in synchronization with a clock on which these pixel data G1 through G4 are inputted in the delay circuits.

The comparing block 42 is composed of comparators 42a through 42f into which two of the four pieces of pixel data inputted in the input block 40 are inputted. Namely, the comparing block 42 includes the comparator 42a into which the pixel data G1 and G2 are inputted, the comparator 42b into which the pixel data G1 and G3 are inputted, the comparator 42c into which the pixel data G1 and G4 are inputted, the comparator 42d into which the pixel data G2 and G3 are inputted, the comparator 42e into which the pixel data G2 and G4 are inputted, and the comparator 42f into which the pixel data G3 and G4 are inputted.

The pixel data G1 is inputted in the comparator 42a at its terminal A and the pixel data G2 at its terminal B. The pixel data G1 is inputted in the comparator 42b at its terminal A and the pixel data G3 at its terminal B. The pixel data G1 is inputted in the comparator 42c at its terminal A and the pixel data G4 at its terminal B. The pixel data G2 is inputted in the comparator 42d at its terminal A and the pixel data G4 at its terminal B. The pixel data G2 is inputted in the comparator 42e at its terminal A and the pixel data G4 at its terminal B. The pixel data G3 is inputted in the comparator 42f at its terminal A and the pixel data G4 at its terminal B.

The comparison results are inputted from the comparing block 42 into the computing block 43. Based on the inputted comparison results, the computing block 43 selects the second-place pixel data and the third-place pixel data from the pixel data G1 through G4 inputted in the input block 40. The computing block 43 is composed of plural selectors. If the comparison results of the, comparator 42a, the comparator 42b, and the comparator 42c are any of (L, H, H), (H, L, H), and (H, H, L) for example, the computing block 43 outputs a computing result with the pixel data G1 as the second place to the output block 44. If the comparison results of the comparator 42a, the comparator 42d, and the comparator 42e are any of (H, L, L), (H, L, H), and (H, H, L) for example, the computing block 43 outputs a computing result with the pixel data G2 as the third place to the output block 44.

The output block 44 is connected to the input block 40 and the computing block 43. The pixel data G1 through G4 are inputted from the input block 40 into the output block 44. At the same time, the computational result is inputted from the computing block 43 into the output block 44. The output block 44 has a selector 44a for outputting pixel data according to the computational result indicative of the second place and a selector 44b for outputting the pixel data G1 through G4 according to the computational result indicative of the third place. The output block 44 also has an "00" terminal into which the pixel data G1 inputted from the terminal 40a is inputted, a terminal "10" into which the pixel data G2 inputted from the terminal 40b is inputted, a terminal "01" into which the pixel data G3 inputted from the terminal 40b is inputted, and a terminal "11" into which the pixel data G4 inputted from the terminal 40c is inputted.

An output block 45 is connected to the output block 44, the horizontal-direction interpolator 15a, and the vertical-direction interpolator 15bThe output block 45 outputs the pixel data G1 through G4 indicative of the second place and the third place outputted from the output block 44 to the horizontal-direction interpolator 15a and the vertical-direction interpolator 15b.

When performing edge processing by the edge processor 15c thus constituted, the pixel data G1, G2, G3, and G4 around the interpolated pixel data G' obtained by interpolation by the horizontal-direction interpolator 15a and the vertical-direction interpolator 15b are inputted in the input block 40 as shown in FIG. 15. A numeral in each of the pixel data G1 through G4 shown in FIG. 15 denotes the size thereof. The pixel data G1 is inputted in the input block 40 at the terminal 40a, the pixel data G2 is inputted at the terminal 40b, the pixel data G3 is also inputted at the terminal 40b, and the pixel data G4 is inputted at the terminal 40c. Then, the input block 40 outputs these inputted pixel data G1 through G4 to the comparators 42a through 42f by way of the delay circuits 41a through 41d as shown in FIG. 14.

Next, the comparators 42a through 42f make comparison between the sizes of the inputted pixel data G1 through G4 and output comparison results to the computing block 43. At this moment, if the pixel data inputted at the terminal A is found greater than the pixel data inputted at the terminal B, each comparator outputs comparison result H to the computing block 43. If the pixel data inputted at the terminal A is found equal to or smaller than the pixel data inputted at the terminal B, each comparator output comparison result L to the computing block 43.

According to the comparison results supplied from the comparators 42a through 42f, the computing block 43 determines the second-place and third-place pixel data G1 to G4 of the pixel data G1 through G4 inputted in the input block 40 and outputs computational results to the output block 44. The computational result indicative of the second place is outputted to the selector 44a. The computational result indicative of the third place is outputted to the selector 44b. Then, the selectors 44a and 44b select, based on the computational results, the pixel data G1 to G4 that correspond to the second place and the third place of the pixel data G1, G2, G3, and G4 and output the selected pixel data to the output block 45.

The output block 45 outputs the received pixel data G1 to G4 corresponding to the second place and the third place to the horizontal-direction interpolator 15a and the vertical-direction interpolator 15b.

Next, the horizontal-direction interpolator 15a and the vertical-direction interpolator 15b compute the size of interpolated pixel data G' from the pixel data G1 to G4 corresponding to the second place and the third place.

Therefore, according to the edge processor 15c thus constituted, if the size of the pixel data G1 is 100, the size of the pixel data G2 is 100, the size of the pixel data G3 is 100, and the size of the pixel data G4 is 0 for example, the sizes of the pixel data between the second place and the third place are all 100, so that the size of the interpolated pixel data G' is limited to 100. Consequently, according to the edge processor 15c, the interpolated pixel data G' obtained by vertically interpolating the pixel data shown in FIG. 15 is not computed as (100+0)=50.

The correlation value detecting block 16 receives pixel data from the above-mentioned gamma correcting circuit 14. The correlation value detecting block 16 includes a horizontal-direction correlation detector 16a for detecting a horizontal-direction correlation value and a vertical-direction correlation detector 16b for detecting a vertical-direction correlation value.

To compute a horizontal correlation value Ch, the horizontal-direction correlation detector 16a uses a filter indicated by a relation (3) shown below for a pixel for which pixel data G exists or a filter indicated by a relation (4) shown below for a pixel for which pixel data G does not exist.

$$Ch = \begin{bmatrix} -1 & 0 & 2 & 0 & -1 \\ 0 & 0 & 0 & 0 & 0 \\ -6 & 0 & 12 & 0 & -6 \\ 0 & 0 & 0 & 0 & 0 \\ -1 & 0 & 2 & 0 & -1 \end{bmatrix} \quad (3)$$

$$Ch = \begin{bmatrix} -1 & 0 & 2 & 0 & -1 \\ 0 & 0 & 0 & 0 & 0 \\ -1 & 0 & 2 & 0 & -1 \end{bmatrix} \quad (4)$$

To be more specific, the horizontal correlation value Ch is computed through LPF (Low-Pass Filter) [1, 0, 6, 0, 1] by use of the relation (3) if the pixel data G exists in vertical direction or through LPF [1, 0, 1] by use of the relation (4) if the pixel data G does not exist. Also, the horizontal correlation value Ch is computed through BPF (Band-Pass Filter) [−1, 0, 2, 0, −1] in horizontal direction.

Figure 16:
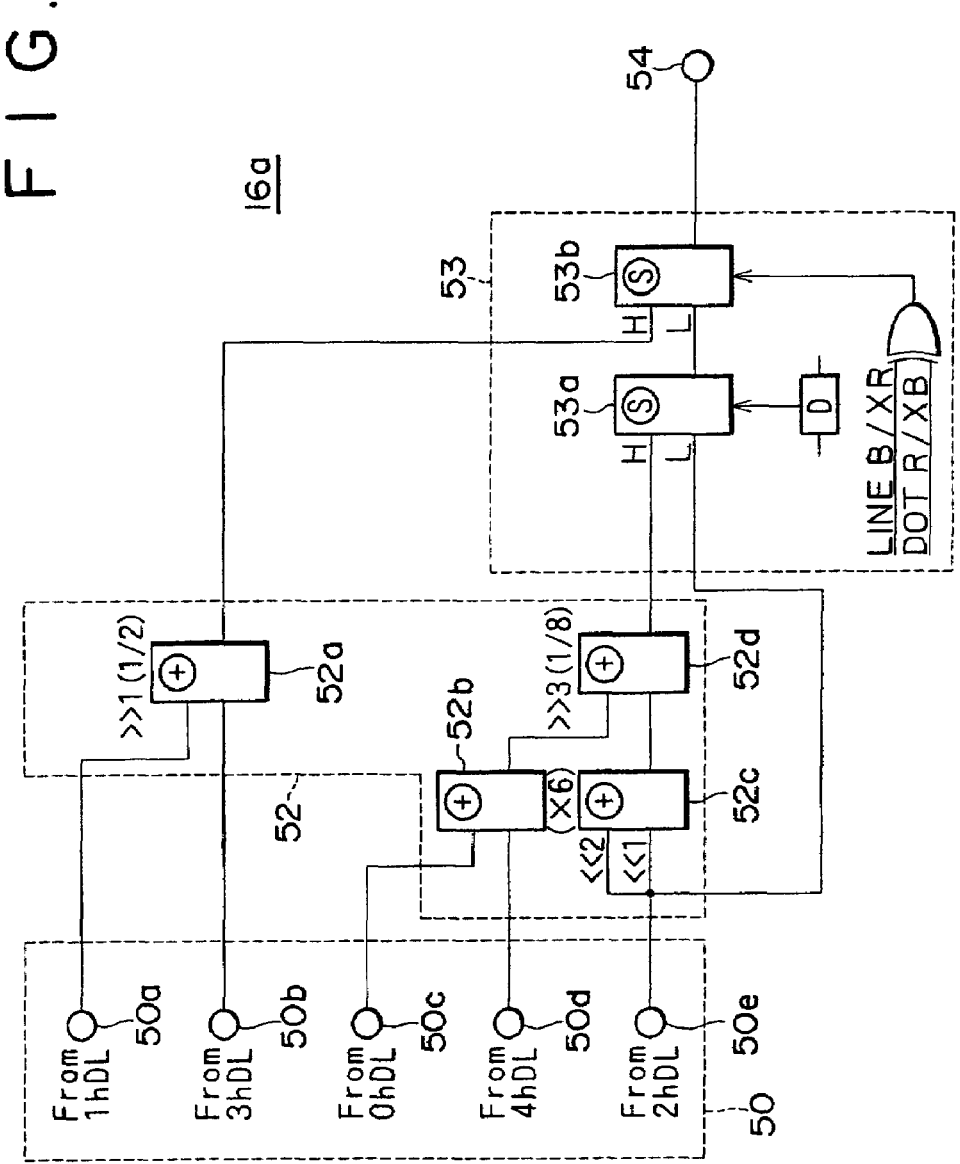
FIG. 16 is a circuit diagram illustrating an example of a constitution of a horizontal correlation detector.

Referring to FIG. 16, the horizontal-direction correlation detector 16a includes an input block 50 into which pixel data are inputted from the gamma correcting circuit 14 at terminals 50a through 50e, a filter 52 for generating horizontal correlation value Ch from the inputted pixel data, a selector 53 into which the horizontal correlation value Ch is inputted, and an output block 54 for outputting the horizontal correlation value Ch received from the selector 53.

The input block 50 sequentially receives the vertically arranged pieces of pixel data shown in FIG. 3 from the gamma correcting circuit 14. The input block 50 has a terminal 50a at which the pixel data in 1h is inputted, a terminal 50b at which the pixel data in 3h is inputted, a terminal 50c at which the pixel data in 0h is inputted, a terminal 50d at which the pixel data in 4h is inputted, and a terminal 50e at which the pixel data in 2h is inputted.

The filter 52 includes an adder 52a into which the pixel data are inputted from the terminals 50a and 50b, an adder 52b into which the pixel data are inputted from the terminals 50c and 50d, an adder 52c into which the pixel data are inputted from the terminal 50e, and an adder 52d into which the outputs of the adders 52b and 52c are inputted. Like the filter 33 shown in the above-mentioned horizontal-direction interpolator 15a and the vertical-direction interpolator 15b, the filter 52 constitutes filter [1, 0, 6, 0, 1]/8 by the adders 52b, 52c, and 52d and filter [1, 0, 1]/2 by the adder 52a.

The selector 53 has a selector 53a into which the output of the adder 52d and the pixel data from the terminal 50e are inputted and a selector 53*b* into which the output of the adder 52*a* and the output of the selector 53*a* are inputted. The selectors 53*a* and 53*b* are controlled by a control signal supplied from the control block 10. To be more specific, when the control signal H comes from the control block 10, the selector 53*a* outputs the pixel data received through the adders 52*b*, 52*c*, and 52*d*. When the control signal L comes from the control block 10, the selector 53*a* outputs the pixel data received from the terminal 50*e*. The selector 53*b* outputs, according to the control signal received from the control block 10, the horizontal correlation value Ch that passed the adder 52*a* or the pixel data that passed the selector 53*a*.

It should be noted that, in the horizontal-direction correlation detector 16*a*, the pixel data from which a correlation value is computed may be inputted in the selector 53 without passing the adders 52*b*, 52*c*, and 52*d*. Thus, use of the pixel data G as a correlation value without passing the filter 52 can restrict the band of the pixel data G from lowering and simplify the circuitry.

The selector 53*b* is controlled to pass the outputs of the adders 52*b*, 52*c*, and 52*d* or the output from the terminal 50*e* for a pixel for which the pixel data G exists. The selector 53*b* is controlled to pass the output of the adder 52*a* for a pixel for which the pixel data G does not exist.

The output block 54 outputs the horizontal correlation value Ch received from the selector 53*b*. The output block 54 is connected to the noise canceling block 17 through BPF [−1, 0, 2, 0, −1] in horizontal direction not shown, outputting the horizontal correlation value Ch to the noise canceling block 17.

The vertical-direction correlation detector 16*b* computes a vertical correlation value Cv by use of a filter indicated in a relation (5) shown below for a pixel for which the pixel data G exists or a filter indicated in a relation (6) shown below for a pixel for which the pixel data G does not exist.

$$Cv = \begin{bmatrix} -1 & 0 & -6 & 0 & -1 \\ 0 & 0 & 0 & 0 & 0 \\ 2 & 0 & 12 & 0 & 2 \\ 0 & 0 & 0 & 0 & 0 \\ -1 & 0 & -6 & 0 & -1 \end{bmatrix} \quad (5)$$

$$Cv = \begin{bmatrix} -1 & 0 & -1 \\ 0 & 0 & 0 \\ 2 & 0 & 2 \\ 0 & 0 & 0 \\ -1 & 0 & -1 \end{bmatrix} \quad (6)$$

To be more specific, the vertical correlation value Cv is computed through BPF [−1, 0, 2, 0, −1] by use of the relations (5) and (6) in vertical direction. If the pixel data G exists, the vertical correlation value Cv is computed through LPF [1, 0, 6, 0, 1] by use of the relation (5) in horizontal direction or through LPF [1, 0, 1] by use of the relation (6) if the pixel data G does not exist.

Figure 17:
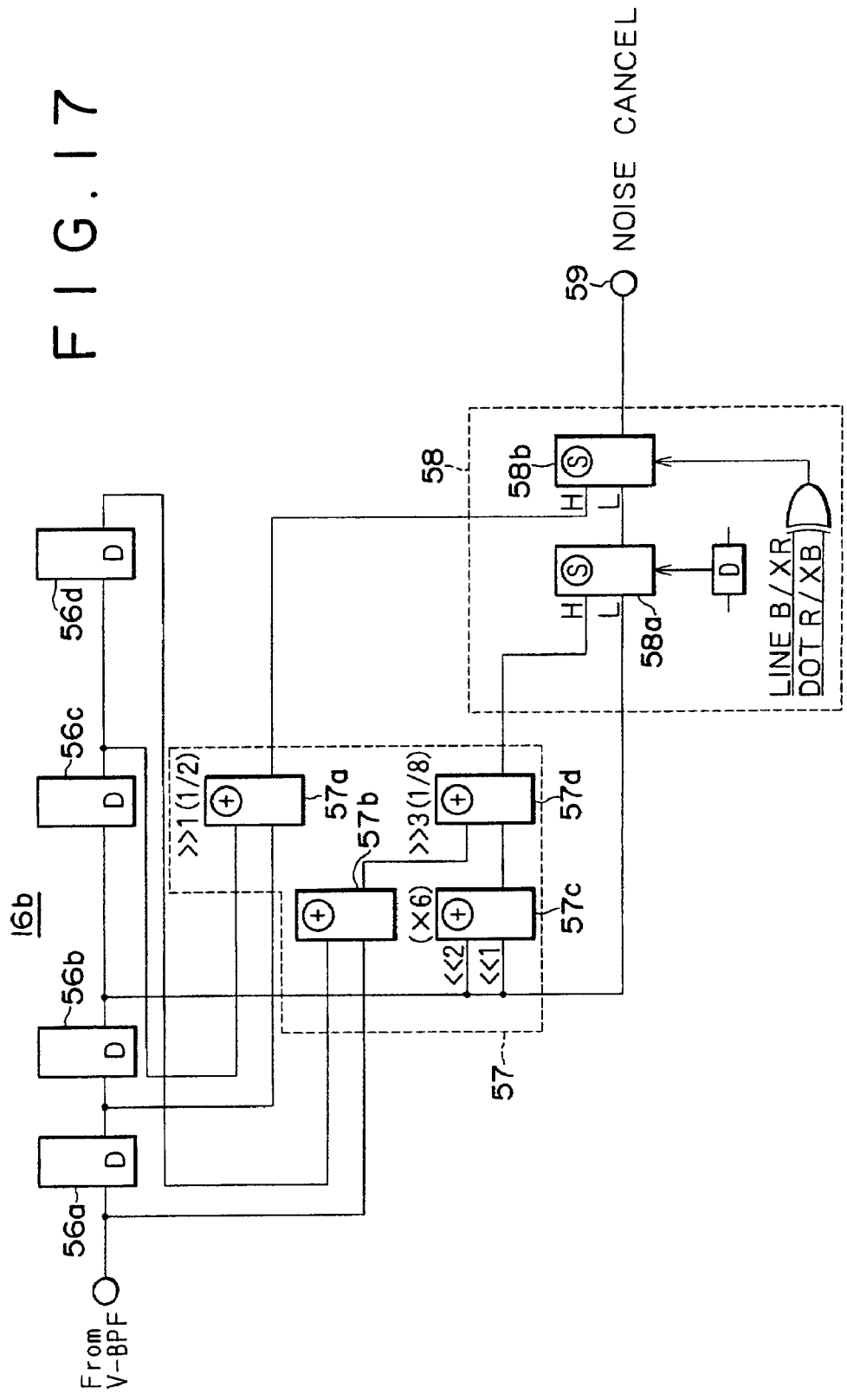
FIG. 17 is a circuit diagram illustrating an example of a constitution of a vertical correlation detector.

Referring to FIG. 17, the vertical-direction correlation detector 16*b* includes an input block 55 into which pixel data are inputted through BPF [−1, 0, 2, 0, −1] in vertical direction not shown, delays circuits 56*a* through 56*d* into which the pixel data are inputted from the input block 55, a filter 57 for generating a vertical correlation value Cv from the pixel data received from the delay circuits 56*a* through 56*d*, a selector 58 into which the vertical correlation value Cv is inputted through the filter 57, and an output block 59 for outputting the vertical correlation value Cv received from the selector 58.

The input block 55 sequentially receives the pixel data from the gamma correcting circuit 14 through BPF [−1, 0, 2, 0, −1] in vertical direction not shown. Then, the input block 55 outputs the received pixel data to the delay circuits 56*a* through 56*d* that are similar in constitution to the delay circuit 31 provided in the above-mentioned horizontal-direction interpolator 15*a*.

The filter 57 is similar in constitution to the filter 52 provided in the horizontal-direction correlation detector 16*a* and includes adders 57*a*, 57*b*, 57*c*, and 57*d*. Like the filter 53 provided in the horizontal-direction correlation detector. 16*a*, the filter 57 constitutes filter [1, 0, 6, 0, 1]/8 by the adders 57*b*, 57*c*, and 57*d* and filter [1, 0, 1]/2 by the adder 57*a*. It should be noted that, like the horizontal-direction correlation detector 16*a*, the vertical-direction correlation detector 16*b* may input the pixel data from which the correlation value Cv is computed into the selector 58 without passing the adders 57*b*, 57*c*, and 57*d*.

The selector 58 is similar in constitution to the selector 53 provided in the horizontal-direction correlation detector 16*a* and has selectors 58*a* and 58*b*. The selectors 58*a* and 58*b* are controlled by a control signal supplied from the control block 10.

The selector 58*b* is controlled to pass the outputs of the adders 57*b*, 57*c*, and 57*d* or the output of the delay circuit 56*b* for a pixel for which pixel data G exists. For a pixel for which pixel data G does not exist, the selector 58*b* is controlled to pass the output of the adder 57*a*.

The output block 59 outputs the vertical Correlation value Cv received from the selector 58*b*. The output block 59 is connected to the noise canceling block 17 and outputs the vertical correlation value Cv to the noise canceling block 17.

The correlation value detecting block 16 thus constituted can compute a correlation value C only from the pixel data G for example through the circuits that use the relations (3) through (6), thereby providing the horizontal and vertical correlation values Ch and Cv without being affected by the color of a subject.

Referring to FIG. 2, the noise canceling block 17 has a noise canceler 17*a* connected to the horizontal-direction correlation detector 16*a* and a noise canceler 17*b* connected to the vertical-direction correlation detector 16*b*. The noise cancelers 17*a* and 17*b* a constitution similar to that shown in FIG. 18.

Figure 18:
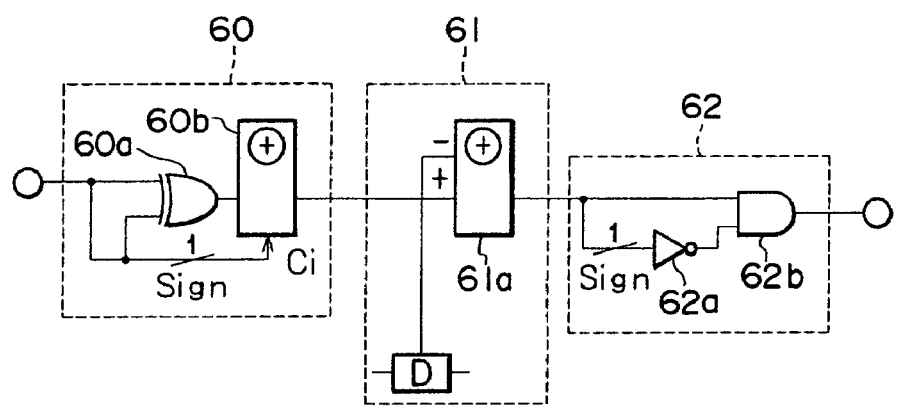
FIG. 18 is a circuit diagram illustrating an example of a constitution of a noise canceler.

Referring to FIG. 18, the noise cancelers 17*a* and 17*b* include each an absolute value converting circuit 60 into which the correlation value C is inputted from the correlation detectors 16*a* and 16*b*, a subtracting circuit 61 into which the absolute correlation value is inputted, and a limiter 62 into which the subtracted correlation value C is inputted.

The absolute value converting circuit 60 is composed of an exclusive OR gate 60*a* and an adder 60*b* for example. The absolute value converting circuit 60 makes absolute the received correlation value C to provide a positive value. Then, the absolute value converting circuit 60 outputs the resultant absolute correlation value C to the subtracting circuit 61.

The subtracting circuit 61 is constituted by a subtractor 61*a* for example. The correlation value C is inputted from the absolute value converting circuit 60 into the subtractor 61*a*. The subtractor 61*a* receives a control signal from the control block 10 indicative of a subtrahend for subtracting a predetermined value from the inputted correlation value C.

Then, the subtractor 61*a* subtracts the subtrahend from the correlation value C according to the control signal. Thus, by performing subtraction processing, the subtractor 61*a* subtracts, as indicated by a dashed line of FIG. 19A, the output of the correlation value C as indicated by a solid line of FIG. 19A. Then, the subtracting circuit 61 outputs the subtracted correlation value C to the limiter 62.

Figures 19A, 19B:
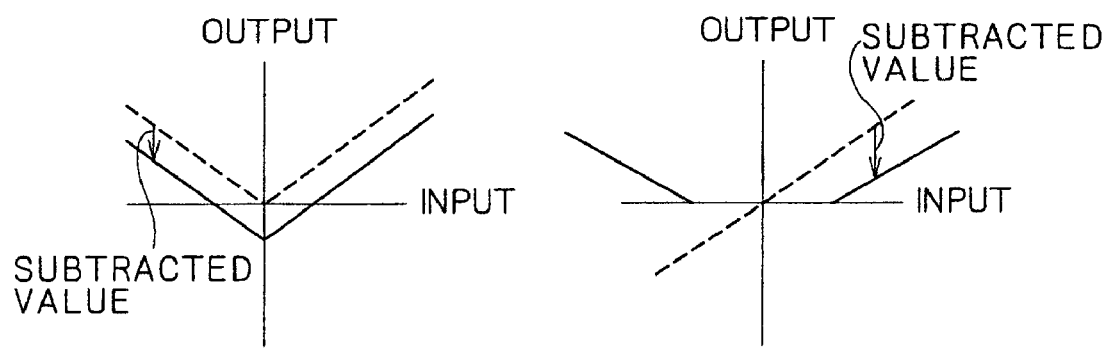
FIG. 19A is a diagram illustrating an example of performing subtraction processing on a correlation value inputted in the noise canceler.
FIG. 19B is a diagram illustrating an example in which the correlation value is limited by a negative value.

The limiter 62 is composed of an inverter 62*a* and an AND gate 62*b* for example. The limiter 62 performs processing so that the correlation value C subtracted by the subtracting circuit 61 to be a negative value as shown in FIG. 19B becomes 0. Then, the limiter 62 outputs the resultant correlation value C to the offset circuit 18.

The noise canceling block 17 thus constituted performs subtracting processing on the inputted correlation value C to eliminate minute correlation values C, thereby canceling the noises at minute values. According to the noise canceling block 17, the correlation value C is computed by passing the same through the BPF, so that the correlation value C computed for the noise of the CCD 3 itself can be canceled. In addition, according to the noise canceling block 17, if a noise component is included in the pixel data generated by the CCD 3 and the correlation value C is computed for that noise, the minute correlation values can be subtracted. Therefore, according to the noise canceling block 17, interpolated pixel data can be weighted by use of the correlation value C having few noises, thereby preventing image degradation due to the false-color signal included in an output image.

Referring to FIG. 2, the offset circuit 18 has an offset circuit 18*a* into which a horizontal correlation value C is inputted from the noise canceler 17*a* and an offset circuit 18*b* into which a vertical correlation value C is inputted from the noise canceler 17*b*. These offset circuits 18*a* and 18*b* have a similar constitution as shown in FIG. 20.

Figure 20:
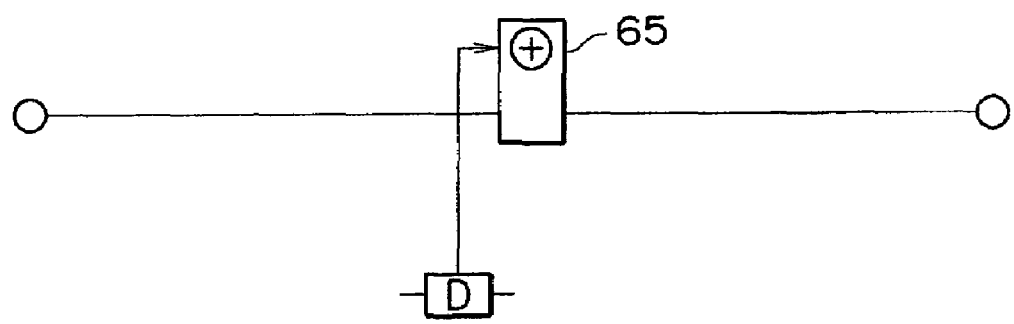
FIG. 20 is a diagram illustrating an example of a constitution of an offset circuit.

The offset circuits 18*a* and 18*b* are each constituted by an adder 65 for example as shown in FIG. 20. The correlation value C is inputted in the adder 65 from the noise cancelers 17*a* and 17*b*. A control signal indicative of a predetermined offset value is also inputted in the adder 65 from the control block 10.

Figure 21:
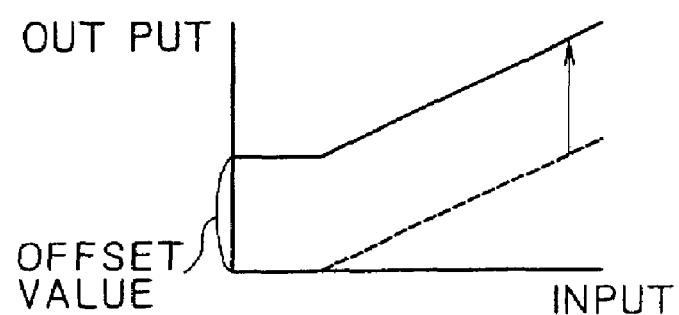
FIG. 21 is a graph illustrating an example of the variation in input/output characteristic obtained when an offset value is added to a correlation value inputted in the offset circuit.

When the correlation value C is inputted from the noise cancelers 17*a* and 17*b*, the adder 65 adds the offset value to the correlation value C. Then, the adder 65 outputs a result of the addition to the normalizing circuit 19. Namely, the offset circuits 18*a* and 18*b* add the offset value to the correlation value C as indicated by a dashed line of FIG. 21 supplied from the noise cancelers 17*a* and 17*b* for example to produce a correlation value C as indicated by a solid line of FIG. 21.

Figure 22:
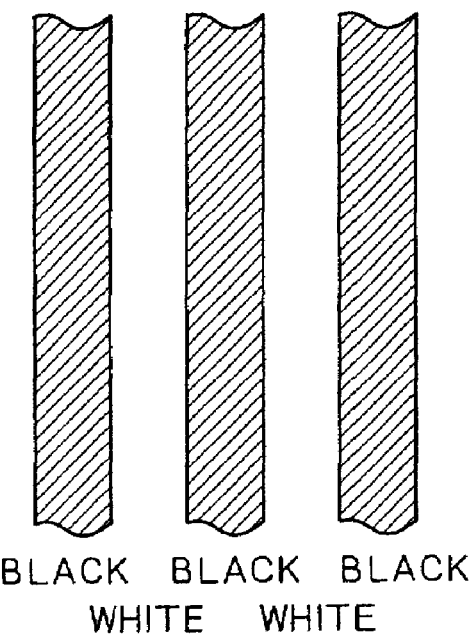
FIG. 22 is a diagram illustrating an example of image data that changes in color for each adjacent pixel data.

Thus, in the offset circuits 18*a* and 18*b*, the offset value is added to a correlation value C, so that if the amplitude of the inputted correlation value C is about 0, a large correlation value C can be provided. The offset circuits 18*a* and 18*b* thus constituted can prevent the horizontal correlation value Ch and the vertical correlation value Cv from being drastically changed even if the amplitudes of a high-frequency signal and these correlation values are minute in the case of pixel data for which no correlation value C can be obtained by the above-mentioned correlation detecting block 16, for example pixel data constituting the image data in which color change takes place for each pixel. Namely, according to the offset circuits 18*a* and 18*b*, adding the offset value to a correlation value C makes the interpolated pixel data to be weighted by a correlation value C approach the direction in which the interpolation is made by arithmetic mean. Therefore, according to the offset circuits 18*a* and 18*b*, if the amplitude of an inputted correlation value C is minute or in the case of a high-frequency signal changing for each pixel as shown in FIG. 22, the horizontal correlation value Ch and the vertical correlation value Cv do not drastically change from 1 to 0 and 0 to 1 respectively in adjacent pixels.

Referring to FIG. 2, the normalizing circuit 19 is composed of an adder 19*a* into which a horizontal correlation value Ch and a vertical correlation value Cv are inputted from the offset circuits 18*a* and 18*b* and a divider 19*b* into which the vertical correlation value Cv and the output of the adder 19*a* are inputted The normalizing circuit 19 thus constituted adds the vertical correlation value Cv and the horizontal correlation value Ch by the adder 19*a* and outputs a result of this addition to the divider 19*b*, in which the vertical correlation value Cv is divided by the result of the addition. Then, the normalizing circuit 19 computes a vertical correlation value Cv indicated by a relation (7) shown below. The horizontal correlation value Ch can be expressed as a relative value of the vertical correlation value Cv as indicated by a relation (8) shown below.

$$\text{Vertical correlation value} = \frac{Cv}{Cv + Ch} \quad (7)$$

$$\text{Hortizontal correlation value} = 1 - \frac{Cv}{Cv + Ch} \quad (8)$$

Figure 23:
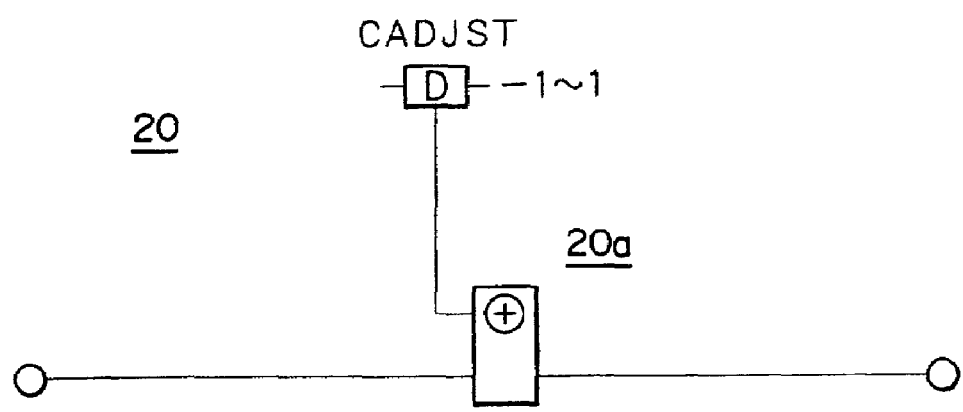
FIG. 23 is a diagram illustrating an example of a constitution of a bias correcting circuit.

The bias correcting circuit 20 is constituted by an adder 20*a* as shown in FIG. 23. The vertical correlation value Cv indicated by the relation (7) is inputted in the bias correcting circuit 20 from the normalizing circuit 19. A correction value α is inputted into the adder 20*a* from the control block 10. This correction value α is generated by the control block 10 and adjusted in a range of −1 to 1 according to the setting of the CCD 3 for example.

The bias correcting circuit 20 adds the inputted vertical correlation value Cv to the inputted bias correcting value α. As a result of this addition, the vertical correlation value Cv becomes as indicated by a relation (9) shown below.

$$\text{Vertical correlation value} = \frac{Cv}{Cv + Ch} + \alpha \quad (9)$$

Figure 24:
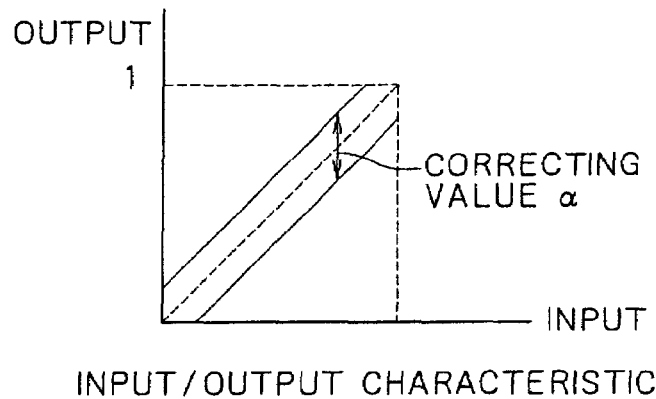
FIG. 24 is a diagram illustrating an example of the variation in input/output characteristic obtained when a correction value is added to a correlation value inputted in the bias correcting circuit.
Figure 25:
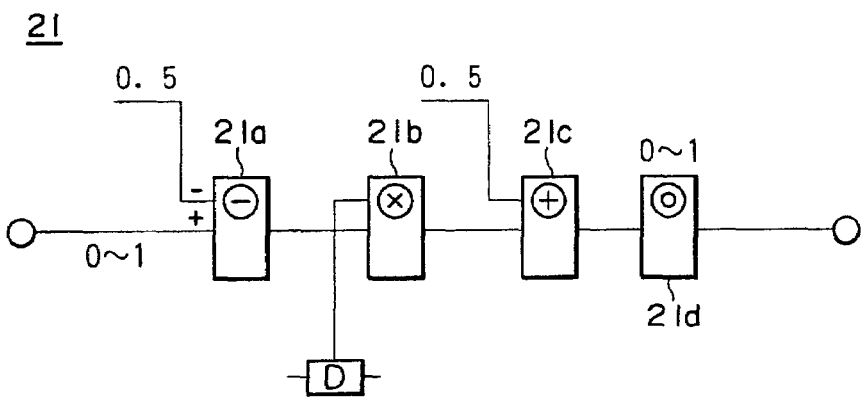
FIG. 25 is a diagram illustrating an example of a constitution of an emphasis/deemphasis circuit.

Therefore, as shown in FIG. 24 for example, the bias correcting circuit 20 can change the inputted vertical correlation value Cv indicated by a dashed line to a value between the solid lines by adding the correction value α. Namely, by adding the correction value α to a vertical correlation value Cv, the bias correcting circuit 20 can control and correct the vertical correlation value Cv by controlling the correction value a inputted from the control block 10 if the vertical correlation value Cv and the horizontal correlation value Ch do not reach a same level due to the distortion or the like in a signal coming from the CCD 3. In addition, if the relationship between vertical correlation and horizontal correlation cannot be correctly detected due the aspect ratio of the CCD or a distortion caused by detection of an analog signal outputted from the CCD, the bias correcting circuit 20 can control the balance between the horizontal correlation value Ch and the vertical correlation value Cv by controlling the correction value a supplied from the control block 10.

The emphasis/deemphasis circuit 21 is composed of a subtractor 21*a* into which the vertical correlation value Cv is inputted from the bias correcting circuit 20, a multiplier 21b into which the subtracted vertical correlation value Cv is inputted, an adder 21c into which the multiplied vertical correlation value Cv is inputted, and a limiter 21d into which the added vertical correlation value Cv is inputted.

In the subtractor 21a, the vertical correlation value Cv having a value 0 to 1 is inputted from the bias correcting circuit 20 and subtraction processing is performed on the inputted vertical correlation value Cv. The subtractor 21a subtracts only 0.5 from the vertical correlation value Cv. The multiplier 21b perform multiplication processing on the vertical correlation value Cv based on a control signal indicative of a multiplier inputted from the control block 10. The adder 21c adds only 0.5 to the vertical correlation value Cv. The limiter 21d limits the inputted vertical correlation value Cv in a certain range.

Figure 26:
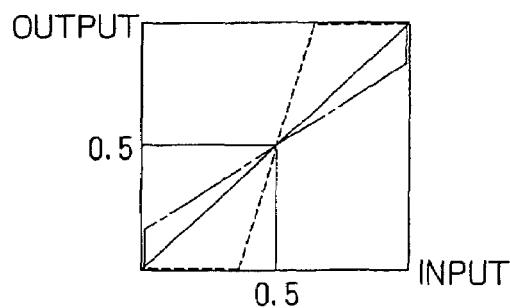
FIG. 26 is a graph illustrating the variation in input/output characteristic obtained when multiplication is performed on a correlation value inputted in the emphasis/deemphasis circuit.

In the emphasis/deemphasis circuit 21, when the vertical correlation value Cv is inputted from the bias correcting circuit 20, first the subtractor 21a subtracts only 0.5 from the vertical correlation value Cv. Then multiplication processing is carried out on the subtracted vertical correlation value Cv. In this processing, the slope of the input/output of characteristic of the vertical correlation value shown by the solid line in FIG. 26 is varied to the slope shown by the dotted line or the dashed line in FIG. 26 corresponding to the multiplier inputted from the control block 10. Next, the adder 21c adds the 0.5 which has been subtracted by the subtractor 21a to the vertical correlation value Cv. The limiter 21d limits the vertical correlation value Cv in a range of 0 to 1.

The emphasis/deemphasis circuit 21 thus constituted multiplies the vertical correlation value Cv by the multiplier supplied from the control block 10 to vary the slope of the input/output characteristic of the vertical correlation value Cv as shown in FIG. 26. Therefore, according to the emphasis/deemphasis circuit 21, the vertical correlation value Cv can be varied by varying multiplier supplied from the control block 10. Consequently, according to the emphasis/deemphasis circuit 21, when weighting interpolated pixel data as will be described, control may be made so that, by varying a correlation value for weighting the interpolated pixel data, the interpolated data places emphasis on the correlation or interpolation is performed to make the interpolated pixel data approach arithmetic mean. In addition, according to the emphasis/deemphasis circuit 21, a correlation value can be controlled by varying a multiplier even if the amount of light inputted in the CCD 3 is small and therefore the output of the CCD 3 involves a lot of noises to fail the correct computation of the correlation value.

Referring to FIG. 2, the weighted addition circuit 22 is composed of a subtractor 22a into which the vertical correlation value Cv is inputted to generate normalized horizontal correlation value Ch, a multiplier 22b into which the normalized horizontal correlation value Ch is inputted, and a multiplier 22c into which the vertical correlation value Cv is inputted, and an adder 22d into which the vertical and horizontal interpolated pixel data are inputted.

In the weighted addition circuit 22, the vertical correlation value Cv is inputted from the emphasis/deemphasis circuit 21 into the subtractor 22a and the multiplier 22c. The subtractor 22a subtracts the vertical correlation value Cv from 1 to generate the horizontal correlation value Ch. Then, the subtractor 22a outputs the generated horizontal correlation value Ch to the multiplier 22b.

The multiplier 22b receives the vertical interpolated pixel data from the vertical-direction interpolator 15b and the horizontal correlation value Ch from the subtractor 22a. The multiplier 22b multiplies the inputted vertical-direction interpolated pixel data by the inputted horizontal correlation value Ch. Thus, the multiplier 22b performs weighting by multiplying the vertical-direction interpolated pixel data by the horizontal correlation value Ch.

The multiplier 22c receives the horizontal-direction interpolated pixel data from the horizontal-direction interpolator 15a and the vertical correlation value Cv. The multiplier 22c multiplies the inputted horizontal-direction interpolated pixel data by the inputted vertical correlation value Cv. Thus, the multiplier 22c performs weighting by multiplying the horizontal-direction interpolated pixel data by the vertical correlation value Cv.

The adder 22d receives the horizontal-direction interpolated pixel data weighted by the multiplier 22c and the vertical-direction interpolated pixel data weighted by the multiplier 22b. The adder 22d adds the inputted horizontal-direction interpolated pixel data to the inputted vertical-direction interpolated pixel data. Thus, by performing the addition processing, the adder 22d obtains the interpolated pixel data weighted by the vertical and horizontal correlation values. Then, the adder 22d outputs the obtained interpolated pixel data to the contour correcting circuit 23.

The contour correcting circuit 23 is connected to the adder 22d of the weighted addition circuit 22. The interpolated pixel data is inputted in the adder 22d into the contour correcting circuit 23 and a contour emphasis signal is also inputted extracted from a circuit not shown. This contour emphasis signal compensate the degraded response of the CCD 3 and emphasizes the definition thereof. The contour correcting circuit 23 adds the inputted contour emphasis signal to the inputted interpolated pixel data and outputs the result to the Y/C converter 24.

The Y/C converter 24 is connected to the contour correcting circuit 23 and receives the interpolated pixel data therefrom. The Y/C converter 24 converts the inputted interpolated pixel data consisting of R, G, and B into a Y/C signal consisting of a luminance signal (Y) and a color difference signal (C). Then, the Y/C converter 24 outputs the resultant Y/C signal to the color-difference signal suppresser 25.

Figure 27:
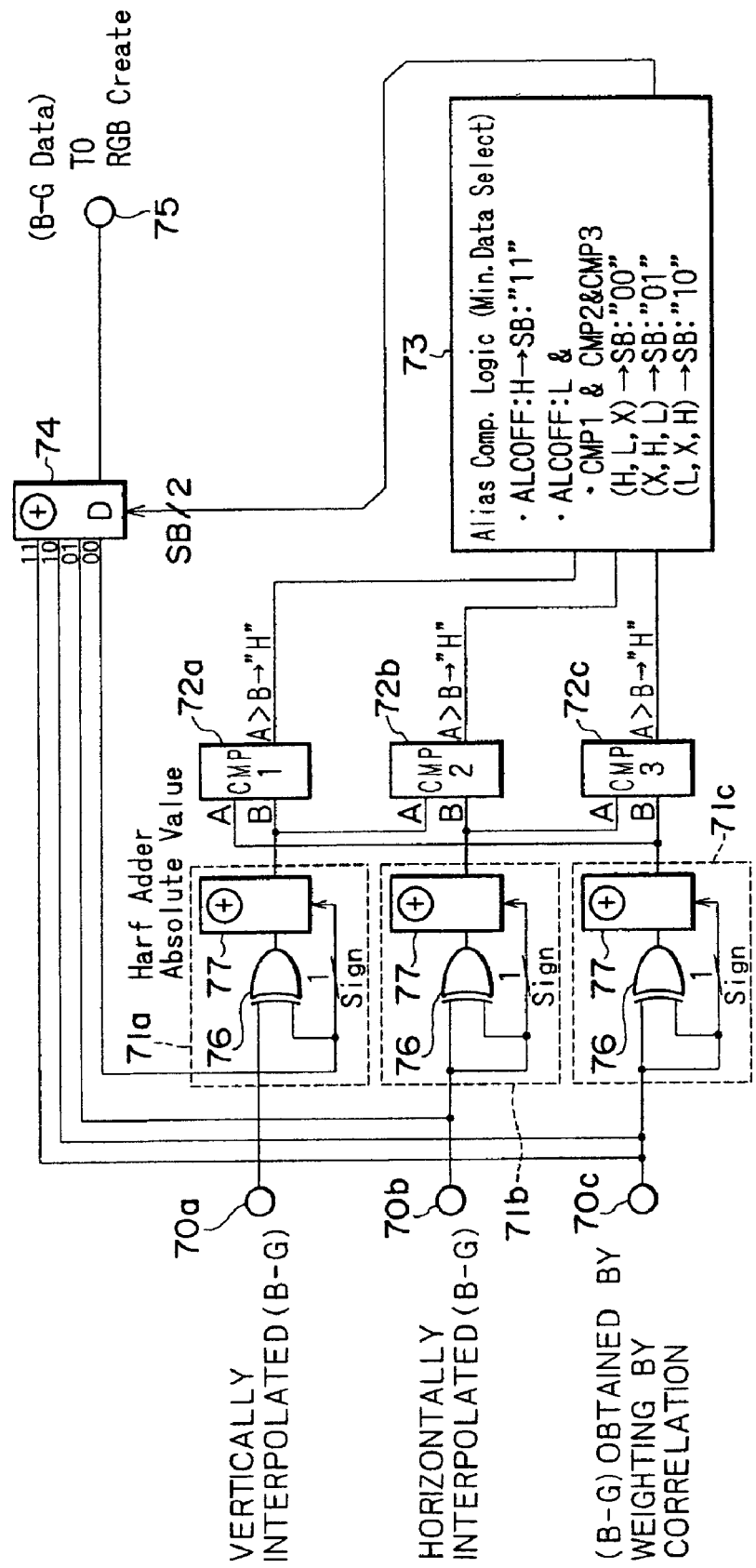
FIG. 27 is a circuit diagram illustrating an example of a constitution of a color difference signal suppressor.

The color-difference signal suppresser 25 is connected to the Y/C converter 24 and receives the Y/C signal therefrom. As shown in FIG. 27, the color-difference signal suppresser 25 is composed of a BG-data suppresser 25a into which a color difference B-G of pixel data with one line consisting of pixel data G and B is inputted and an RG data suppresser 25b into which a color difference R-G of pixel data with one line consisting of pixel data G and R is inputted.

The BG data suppresser 25a has input blocks 70a through 70c into which a color difference B'-G' of interpolated pixel data G' and B' is inputted, absolute value converting circuits 71a through 71c into which the color difference B'-G' is inputted from the input blocks 70a through 70c, comparators 72a through 72c into which the absolute value color-difference B'-G' is inputted from the absolute value converting circuits 71a through 71c, a computing circuit 73 into which a comparison result is inputted from the comparators 72a through 72c, a selector 74 into which a computation result is inputted from the computing circuit 73, and an output block 75 into which the pixel data is inputted from the selector 74.

The color difference B'-G' in vertical direction is inputted in the input block 70a. The color difference B'-G' in horizontal direction is inputted in the input block 70b. The color difference B'-G' weighted by a correlation value is inputted in the input block 70c. The input block 70b outputs the inputted color difference B'-G' to the absolute value converting circuit 71a. The input block 70b outputs the inputted color difference B'-G' to the absolute value converting circuit 71b. The input block 70c outputs the inputted color difference B'-G' to the absolute value converting circuit 71c.

The absolute value converting circuits 71a through 71c are each composed of an exclusive OR gate 76 and an adder 77 for example. The absolute value converting circuits 71a through 71c make absolute the inputted color difference B'-G' into a positive value. The absolute value converting circuits 71a through 71c output the absolute value color difference B'-G' to the comparators 72a through 72c.

The comparator 72a receives at its terminal B the color difference B'-G' through the absolute value converting circuit 71a and at its terminal A the color difference B'-G' through the absolute value converting circuit 71c. The comparator 72b receives at its terminal A the color difference B'-G' through the absolute value converting circuit 71a and at its terminal B the color difference B'-G' through the absolute value converting circuit 71b. The comparator 72c receives at its terminal A the color difference B'-G' through the absolute value converting circuit 71b and at its terminal B the color difference B'-G' through the absolute value converting circuit 71c. The comparators 72a through 72c each compare the magnitudes of the color differences B'-G' inputted at the terminals A and B. If the color difference B'-G' inputted at the terminal A is found greater than that inputted at the terminal B, the comparators output comparison result H to the computing circuit 73. If the color difference B'-G' inputted at the terminal A is found equal to or smaller than that inputted at the terminal B, the comparators output a comparison result L to the computing circuit 73.

The computing circuit 73 receives the comparison result from the comparators 72a through 72c and a control signal from the control block 10. The computing circuit 73 generates a computation result based on these comparison result and the control signal and outputs the generated computation result to the selector 74.

If the control signal H comes, the computing circuit 73 outputs a computation result 11. If the control signal L comes, the computing circuit 73 generates a computation result based on the comparison results coming from the comparators 72a through 72c. If the comparison results of the comparators 72a, 72b, and 72c are H, L, and X respectively, the computing circuit 73 outputs computation result "00" to the selector 74. If the comparison results of the comparators 72a, 27b, and 72c ate X, H, and L respectively, the computing circuit 73 outputs computation result "01" to the selector 74. If the comparison results of the comparators 72a, 72b, and 72c are L, X, and H, the computing circuit 73 outputs computation result "10" to the selector 74.

The selector 74 receives the computation result from the computing circuit 73 and the color differences B'-G' from the input blocks 70a through 70c. The selector 74 receives at its "11" terminal and "10" terminal the color difference B'-G' from the input block 70c, at its terminal "01" the color difference B'-G' from the input block 70b, and at its terminal "00" the color difference B'-G' from the input block 70a. If the computation result "11" comes, the selector 74 outputs the color difference B'-G' received at the terminal "11". If the computation result "10" comes, the selector 74 outputs the color difference B'-G' received at the terminal "10". If the computation result "01" comes, the selector 74 outputs the color difference B'-G' received at the terminal "01". If the computation result "00" comes, the selector 74 outputs the color difference B'-G' received at the terminal "00".

The RG data suppresser 25b receives color difference R'-G' at the input blocks 70a through 70c. The RG data suppresser 25b puts the color difference R'-G' through the absolute value converting circuit 71, the comparator 72, the computing circuit 73, and the selector 74 to select the smallest color difference R'-G' to be outputted at the output block 75.

Therefore, as shown in FIG. 28A, the color difference signal suppresser 25 thus constituted selects the smallest interpolated pixel data Rh and Gh of the interpolated pixel data Rv and Gv for vertically arranged pixel data R and G, the Rh and Gh for horizontally arranged pixel data R and G, and the color difference of weighted interpolated pixel data Rc and Gc. In addition, the color difference signal suppresser 25 selects the interpolated pixel data R'-G' nearest to 0 of the compared interpolated pixel data as shown in FIG. 28B.

The color difference signal suppresser 25 thus constituted outputs the interpolated pixel data received at the input blocks 70a through 70c that has the smallest absolute value. Therefore, when pixel data is generated by the interpolated pixel data weighted by a correlation value in a band in which no correlation can be obtained, the color difference suppressor 25 can prevent an image that has a high brightness and is achromatic (for example, a glistening glass) from taking on a false color. Consequently, the color-difference signal suppresser 25 can prevent a color turn distortion from occurring even in a frequency range in which no correlation is obtained.

The output block 75 outputs the interpolated pixel data from the selector 74 to the output block 26. The output block 26 is a terminal to a recording medium for recording pixel data, a display monitor, or outside equipment for example.

In the foregoing, the description has been made using the camera apparatus 1 having the CCD 3 of primary color coding for example. It will be apparent to those skilled in the art that the present invention is also applicable to any solid state image sensors of coding in which the majority color of the colors presented by the pixel data included in image data is arranged in a checker.

While the preferred embodiments of the present invention have been described using specific terms, such description is for illustrative purposes only, and it is to be understood that changes and variations may be made without departing from the spirit or scope of the appended claims.

What is claimed is:

1. A camera signal processing apparatus comprising:
an interpolated pixel data generating means for interpolating pixel data in at least two directions based on a position of said pixel data and/or pixel data around said position, said pixel data being generated based on an imaging signal coming from a solid-state image sensor in which an imaging light enters through a color filter having a different spectral characteristic for each pixel, thereby separately generating interpolated pixel data in said at least two directions;
a correlation detecting means for detecting a correlation value indicative of a degree of correlation in each of said at least two directions of said interpolated pixel data generated by said interpolated pixel data generating means,
wherein an offset value is added to the correlation value causing the interpolated pixel data to be weighted by the correlation value approach a direction in which the interpolation is made by arithmetic mean;
a noise canceling means for subtracting a predetermined value from said correlation value detected by said correlation value detecting means;

a weighting means for weighting said interpolated pixel data in each of said at least two directions generated by said interpolated pixel data generating means with said correlation value detected by said correlation detecting means in each of said at least two directions and adding together the weighted interpolated pixel data in all of said at least two directions to generate interpolated pixel data; and an image generating means for generating an image based on said interpolated pixel data weighted by said weighting means.

2. The camera signal processing apparatus as set forth in claim 1, wherein said noise canceling means has a subtracting means for performing subtraction on the correlation values of said at least two directions; and a control means for generating a subtrahend for performing subtraction in said subtracting means, wherein said subtracting means receives said subtrahend generated by said control means to perform subtraction based on said subtrahend.

3. The camera signal processing apparatus as set forth in claim 1, wherein said noise canceling means comprising:

an absolute value converting means for making absolute the inputted correlation value in each of said at least two directions;

a subtracting means for subtracting a predetermined value from the correlation value made absolute by said absolute value converting means in each of said at least two directions; and a limiting means for limiting said correlation value subtracted by said subtracting means in each of said at least two directions to a positive value.

4. A camera signal processing method comprising the steps of:

interpolating pixel data in at least two directions based on a position of said pixel data and/or pixel data around said position, said pixel data being generated based on an imaging signal coming from a solid-state image sensor in which an imaging light enters through a color filter having a different spectral characteristic for each pixel, thereby separately generating interpolated pixel data in said at least two directions;

detecting a correlation value indicative of a degree of correlation in each of said at least two directions of said interpolated pixel data, wherein an offset value is added to the correlation value which causes the interpolated pixel data to be weighted by the correlation value approach a direction in which the interpolation is made by arithmetic mean;

subtracting a predetermined value from said correlation value; and weighting said interpolated pixel data in each of said at least two directions with the subtracted correlation value in each of said at least two directions to generate interpolated pixel data obtained by adding together the weighted interpolated pixel data in all of said at least two directions.

5. The camera signal processing method as set forth in claim 4, wherein subtraction is performed on said correlation value in each of said at least two directions based on an inputted subtrahend.

6. The camera signal processing method as set forth in claim 4, wherein the inputted correlation value in each of said at least two directions is made absolute, a predetermined value is subtracted from the absolute correlation value in each of said at least two directions, and the subtracted correlation value in each of said at least two directions is limited to a positive value.

* * * * *